US009518749B2

(12) United States Patent
Kim et al.

(10) Patent No.: US 9,518,749 B2
(45) Date of Patent: Dec. 13, 2016

(54) FORCED EVAPORATIVE HUMIDIFIER USING NANO-VAPOR

(75) Inventors: Byeong Sam Kim, Seongnam-si (KR); Ji Young Kim, Seoul (KR); Jong Hoon Kim, Seoul (KR); Ki Hyun Kwon, Gyeonggi-do (KR); Hwan Soo Cha, Seongnam-si (KR)

(73) Assignee: KOREA FOOD RESEARCH INSTITUTE, Gyeonggi-Do (KR)

( * ) Notice: Subject to any disclaimer, the term of this patent is extended or adjusted under 35 U.S.C. 154(b) by 391 days.

(21) Appl. No.: 14/345,011

(22) PCT Filed: Sep. 13, 2012

(86) PCT No.: PCT/KR2012/007330
§ 371 (c)(1),
(2), (4) Date: Oct. 17, 2014

(87) PCT Pub. No.: WO2013/039329
PCT Pub. Date: Mar. 21, 2013

(65) Prior Publication Data
US 2015/0068962 A1 Mar. 12, 2015

(30) Foreign Application Priority Data

Sep. 14, 2011 (KR) .................. 10-2011-0092381
Dec. 22, 2011 (KR) .................. 10-2011-0140066

(51) Int. Cl.
*F24F 3/14* (2006.01)
*F28C 1/02* (2006.01)
(Continued)

(52) U.S. Cl.
CPC ............ *F24F 3/166* (2013.01); *B01F 3/04475* (2013.01); *B01F 3/04489* (2013.01); *F24F 3/14* (2013.01);
(Continued)

(58) Field of Classification Search
CPC ....... B01F 3/04; B01F 3/0446; B01F 3/04468; B01F 3/04475; B01F 3/04489; F24F 3/14; F24F 3/166; F28D 5/02; F28C 1/00; F28C 1/02
(Continued)

(56) References Cited

U.S. PATENT DOCUMENTS 3,169,575 A * 2/1965 Engalitcheff, Jr. ....... F28D 5/02
165/143
4,801,410 A * 1/1989 Kinney, Jr. ........... F28F 25/087
261/112.2
7,484,718 B2 * 2/2009 Facius ..................... F28C 1/14
261/153

FOREIGN PATENT DOCUMENTS

JP          11-316035        11/1999
KR        1991-0000726        2/1991
(Continued)

*Primary Examiner* — Robert A Hopkins
(74) *Attorney, Agent, or Firm* — Duane Morris LLP; J. Rodman Steele, Jr.; Gregory M. Lefkowitz

(57) ABSTRACT

Provided is a forced evaporative humidifier using nano-vapor, which includes: a housing having an exhaust port formed in an upper surface thereof and a suction port formed at one side of a front surface thereof; a water tank located below the suction port to store water; an injection unit having an injection nozzle located above the suction port, a pump for pulling up the water in the water tank to the injection nozzle, and a transfer tube for transferring the water pulled by the pump; a blowing fan located above the injection nozzle to carry air toward the exhaust port of the housing; a humidifying unit located below the injection nozzle so that films, each having a body surface formed to allow the water injected from the injection nozzle to flow and a plurality of tube-type spacers protruding on the body surface, are stacked in a lateral direction therein; and an eliminator located between the blowing fan and the injection
(Continued)

nozzle to prevent water drops included in a humid air humidified by the humidifying unit from being scattered.

19 Claims, 14 Drawing Sheets

(51) Int. Cl.
    *B01F 3/04*           (2006.01)
    *F24F 3/16*           (2006.01)
    *F24F 6/14*           (2006.01)
    *F24F 11/00*         (2006.01)
    *F24F 6/00*           (2006.01)

(52) U.S. Cl.
    CPC .............. *F24F 6/14* (2013.01); *F24F 11/0008* (2013.01); *F28C 1/02* (2013.01); *F24F 2003/1617* (2013.01); *F24F 2003/1671* (2013.01); *F24F 2003/1689* (2013.01); *F24F 2006/008* (2013.01); *Y02B 30/545* (2013.01)

(58) Field of Classification Search
    USPC ...... 261/30, 153, 115, 118, 72.1, 152, 112.1, 261/151, DIG. 11
    See application file for complete search history.

(56) References Cited

FOREIGN PATENT DOCUMENTS

| | | |
|---|---|---|
| KR | 2001366610000 | 11/1998 |
| KR | 2002201590000 | 1/2001 |

\* cited by examiner (a)　　　　　　　　　　(b)

(a)

(b)

FORCED EVAPORATIVE HUMIDIFIER USING NANO-VAPOR

CROSS-REFERENCE TO RELATED APPLICATIONS

This application is a §371 national stage entry of International Application No. PCT/KR2012/007330, filed Sep. 13, 2012, which claims priority to South Korean Patent Application No. 10-2011-0092381 filed Sep. 14, 2011 and South Korean Patent Application No. 10-2011-0140066 filed Dec. 22, 2011, the entire contents of which are incorporated herein by reference.

TECHNICAL FIELD

The present disclosure relates to a forced evaporative humidifier using vapor of a nano-particle size, and more particularly, to a forced evaporative humidifier using nano-vapor which ensures comfortable humidification by preventing dew condensation while keeping a relative humidity indoors, particularly prevents agricultural products in storage from decaying by preventing dew condensation even though a workhouse or storehouse storing agricultural products is maintained at a high humidity, and also injecting a sterilizer in a gas state to enhance a sterilization effect and prevent equipments provided in a storehouse or laboratory from being stained by the sterilizer.

BACKGROUND ART

Generally, water is sprayed in a living room or a storehouse in a fine particle state which may be easily evaporated, for humidification. However, in case of an indoor space, even though water is supplied in a fine particle state, since the water is in a liquid state, the humidification effect is applied only to a region close to the spot where the water is sprayed. In addition, a low-temperature storehouse for storing agricultural products includes a cooling unit for lowering an internal temperature, and the cooling unit lowers the internal temperature by an evaporator so that water particles are adhered to the surface of the evaporator installed in the storehouse to create an ice layer. At this time, the moisture in the storehouse decreases as much as the amount of created ice, thereby lowering the relative humidity in the storehouse to the level of 65% to 85%. Accordingly, as the humidity in the low-temperature storehouse is lowered, the moisture contained in the agricultural products is evaporated in the air of the storehouse, thereby reducing the weight of the agricultural products. If agricultural products such as fruits and vegetables lose moisture, the moisture is evaporated from the agricultural products to reduce the weight of the agricultural products, and if the moisture is excessively evaporated, the skin of the agricultural products gets dry to deteriorate the appearance and thus lose marketing value. If the moisture loss becomes 5% or above, most agricultural products lose their marketing value, and their prices for farmers are also lowered due to quality deterioration. Meanwhile, crops such as ginger or sweet potato demand a high-humidity environmental condition of 90% to 98% during a curing or storing process after being harvested, and they are decayed if the humidity is low.

In order to solve such a problem, a heating humidifier, a centrifugal humidifier, or an ultrasonic humidifier is used to supply moisture. However, in case of the heating humidifier, even though moisture is supplied to the air in a vapor form, since the moisture has a high temperature, if the moisture is supplied to a low-temperature place, dew condensation occurs and the indoor temperature changes. Further, in case of the centrifugal and ultrasonic humidifiers, since air is humidified in a state where water is turned into particles, if the water particles are supplied to a low-temperature storehouse, dew condensation occurs at the wall of the storehouse or agricultural products in storage, and an amount of ice adhered to the evaporator increases. Therefore, while repeatedly performing a defrosting process, the temperature in the storehouse increases, and accordingly the temperature greatly changes in the storehouse, which makes it difficult to maintain the freshness of the agricultural products. Further, since both the centrifugal humidifier and the ultrasonic humidifier supply water to a storehouse in a water drop state at least minutely, even though the water is not frozen at the evaporator, if dew forms in the storehouse, the proliferation of mold or bacteria is promoted, thereby resultantly decaying the agricultural products.

In addition, in a workplace or laboratory which should maintain a sterilized state, if a sterilizing solution is sprayed, stains or spots created at walls, instruments or worktables should be removed. Moreover, since it is difficult to uniformly spray the sterilizing solution in the space of the laboratory, the sterilized state may not be easily maintained in the entire space of the laboratory.

Therefore, there is a recent need to develop a forced evaporative humidifier using nano-vapor which may humidify an indoor space with vapor, allow agricultural products to be stored while uniformly humidifies an inside of a storehouse at a relative humidity of 90% to 98% to prevent a moisture loss, and prevents dew condensation in the storehouse, and a sterilizing machine using nano-vapor which may uniformly supply a sterilizer to the entire space of a laboratory or the like without dew condensation.

DISCLOSURE

Technical Problem

The present disclosure is directed to providing a forced evaporative humidifier using nano-vapor, which may evaporate a sterilizing solution and supplying the sterilizing solution in a gas state of a nano-particle size to a storehouse, a laboratory or a work place to prevent water drops from forming at the storehouse, the laboratory or the work place and also maintain the inside of the storehouse, the laboratory or the work place in a high temperature or sterilized state.

Technical Solution

In one general aspect, the present disclosure provides a forced evaporative humidifier using nano-vapor, which includes: a housing having an exhaust port formed in an upper surface thereof and a suction port formed at one side of a front surface thereof; a water tank located below the suction port to store water; an injection unit having an injection nozzle located above the suction port, a pump for pulling up the water in the water tank to the injection nozzle, and a transfer tube for transferring the water pulled by the pump; a blowing fan located above the injection nozzle to carry air toward the exhaust port of the housing; a humidifying unit located below the injection nozzle so that films, each having a body surface formed to allow the water injected from the injection nozzle to flow and a plurality of tube-type spacers protruding on the body surface, are stacked in a lateral direction therein; and an eliminator located between the blowing fan and the injection nozzle to prevent water drops included in a humid air humidified by the humidifying unit from being scattered.

According to an embodiment of the present disclosure, the forced evaporative humidifier using nano-vapor may further include a heat exchanger installed at the suction port to allow communication of a fluid, and a barrier for separating the humidifying unit and the heat exchanger from each other may be formed at the housing so that water passing through the humidifying unit does not flow into the heat exchanger.

In addition, the spacers may be arranged alternately in a vertical direction on the same film.

In addition, the films may be stacked so that the spacers communicate with each other.

In addition, the humidifying unit further may include a coupling tube inserted into the spacers of the films stacked in a lateral direction.

In addition, a plurality of slits formed in a horizontal direction between one pair of spacers adjacent to each other in the horizontal direction may be formed in the film, and the plurality of slits may include a first slit protruding so that a cut position of the body surface cut by the slit is oriented toward an upper direction of the body surface and a second slit protruding so that a cut position of the body surface cut by the slit is oriented toward a lower direction of the body surface.

In addition, a water feeding unit for supplying water may be provided at the water tank, and the forced evaporative humidifier using nano-vapor may further include a floating valve for controlling the water feeding unit to open or close according to a location of a float which floats on the water.

In addition, a sterilizer for controlling bacterial multiplication and removing bacteria may be further provided at the water tank.

In addition, the sterilizer may irradiate UV rays into the water tank.

In addition, the sterilizer may apply electricity into the water tank so that the water in the water tank is converted into electrolyzed water.

In addition, the sterilizer may be an ozone water generator dissolving an ozone gas in water to convert the water into ozone water.

In addition, a constant temperature coil may be provided at the water tank to maintain the water in the water tank at a constant temperature.

In addition, the surface of the film of the humidifying unit may be treated to have an antibacterial property.

In addition, the eliminator may have an inlet through which the air humidified by the humidifying unit flows in, an outlet located at a side opposite to the inlet, and an anti-scattering tube provided between the inlet and the outlet so that the inlet and the outlet are alternately located in a vertical direction, and the inlet and the outlet of the eliminator may have a hexagonal shape.

In addition, a dust-removing filter may be mounted to the suction port.

In addition, a defrosting machine may be installed at the heat exchanger.

A temperature-adjusting coil may be formed at the heat exchanger, and the defrosting machine may be located between the temperature-adjusting coils at regular arrangement.

In addition, the water tank may be partitioned by a separation plate, and the water tank partitioned by the separation plate may have a water storage unit for storing water and a supplied liquid storage unit to which a sterilizer or the water in the water storage unit is supplied, the supplied liquid storage unit communicating with the transfer tube.

In addition, the separation plate may have a T shape and partition the water tank into three regions, the water tank partitioned into three regions by the separation plate may further include a sterilizing solution storage unit for storing a sterilizer, and the separation plate may have a water supply port communicatively formed between the water storage unit and the supplied water storage unit to be openable and closeable and a sterilizing solution supply port communicatively formed between the sterilizing solution storage unit and the supplied water storage unit to be openable and closeable.

In addition, the sterilizer may be at least one selected from the group consisting of oxygenated water, chlorine dioxide water, hypochlorous acid water, ozone water, a tetravalent ammonium chloride solution, and electrolyzed water.

Advantageous Effects

According to the present disclosure, since a temperature-controlled air directly humidifies while passing through a humidifying unit, the amount of water humidified may be adjusted according to a target temperature, and since water is evaporated while maximizing a contact area between water and air in the humidifying unit, the percentage of moisture in the air may be enhanced and it is possible to prevent water drops from forming at a place to be humidified. Therefore, the indoor environment may be maintained in a comfortable state. In addition, even in a high-humidity state having humidity of 98% or above, since the humidity is increased by moisture, it is possible to prevent water from being collected at a specific spot and thus prevent mold or bacteria from proliferating. Further, since the sterilizing solution is sprayed to the entire space to be humidified, the entire space may be sterilized, and a small amount of sterilizing solution may also be easily sprayed.

BEST MODE

Figure 1A:
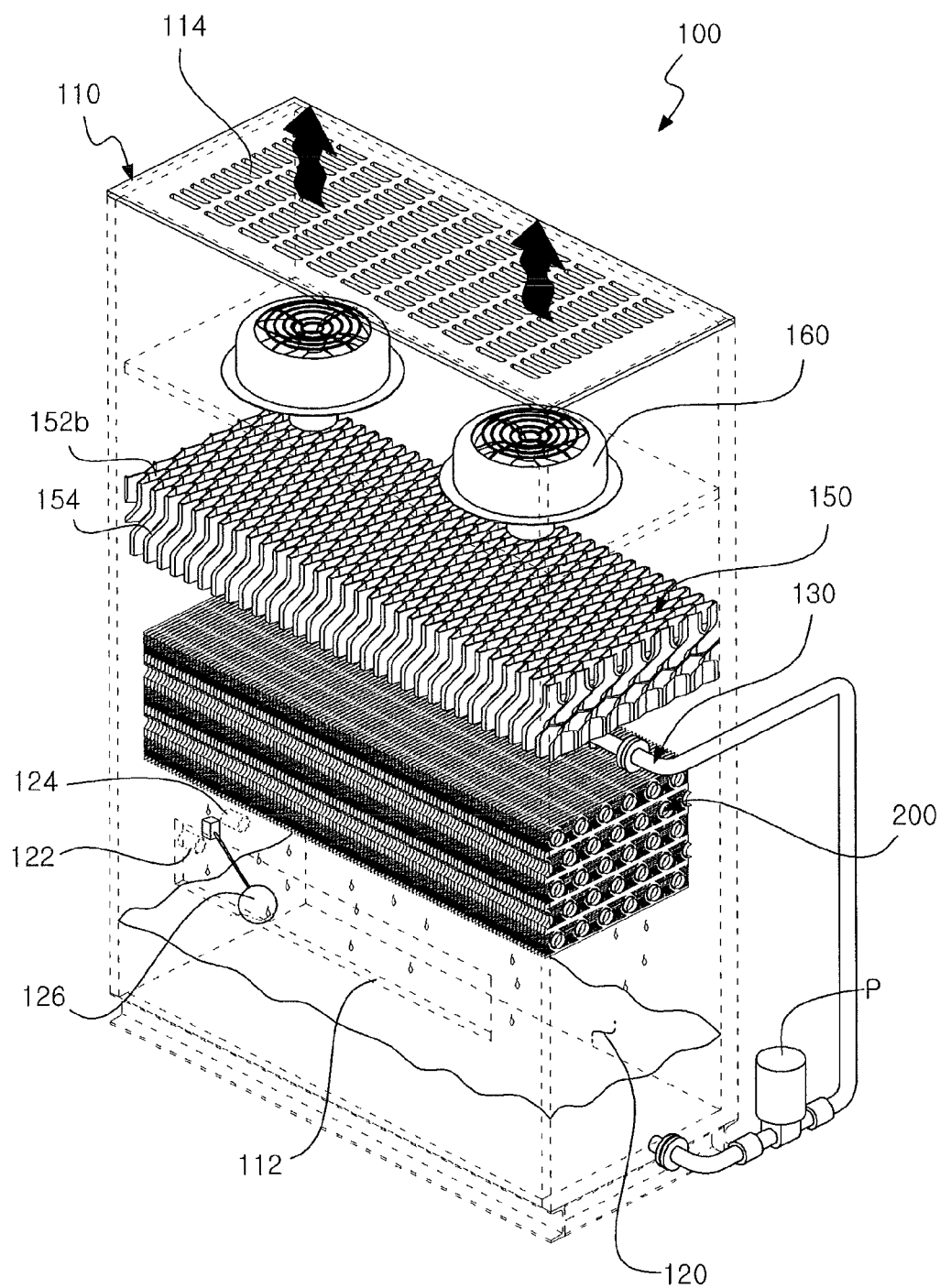
FIGS. 1a and 1b are perspective views showing a forced evaporative humidifier using nano-vapor according to various embodiments of the present disclosure.

As shown in FIGS. 1 and 2, a forced evaporative humidifier using nano-vapor according to the present disclosure includes:

a housing 110 having an exhaust port 114 formed in an upper surface thereof and a suction port 112 formed at one side of a front surface thereof;

a water tank 120 located below the suction port 112 to store water W;

an injection unit 130 having an injection nozzle 132 located above the suction port 112, a pump P for pulling up the water W in the water tank 120 to the injection nozzle 132, and a transfer tube 134 for transferring the water W pulled by the pump P;

a blowing fan 170 located above the injection nozzle 132 to carry air toward the exhaust port 114 of the housing 110;

a humidifying unit 200 located below the injection nozzle 132 so that films 210, each having a body surface 212 formed to allow the water injected from the injection nozzle 132 to flow and a plurality of tube-type spacers 214 protruding on the body surface 212, are stacked in a lateral direction therein;

an eliminator 150 located between the blowing fan 170 and the injection nozzle 132 to prevent water drops included in a humid air humidified by the humidifying unit 200 from being scattered; and a heat exchanger 160 installed at the suction port to allow communication of a fluid.

MODE FOR INVENTION

Hereinafter, the present disclosure will now be described in more detail based on embodiments. However, these embodiments are for illustrative purposes only and not intended to limit the scope of the present disclosure, as obvious to those having ordinary skill in the art.

Different from an existing indirect humidifying method in which water is supplied in a fine particle state, the present disclosure performs humidification by directly supplying an air containing vapor to an air conditioner or a place to be humidified. Therefore, in a forced evaporative humidifier 100 using nano-vapor according to the present disclosure, a humidifying unit 200 allows the air to continuously contact water W to increase the amount of vapor contained in the air. Therefore, different from a centrifugal humidifier or an ultrasonic humidifier, water is supplied in a vapor state into the air so that a humid air is supplied to the indoor place. In addition, since an air containing a sterilizer is directly supplied to a place to be sterilized, different from an existing sterilizing device in which a liquid sterilizer is sprayed to remain sterilizer stains on equipment, the present disclosure may enhance a sterilizing effect and maintain durability of equipment installed in a sterilization spot by supplying a sterilizer in a gas state.

Figure 1B:
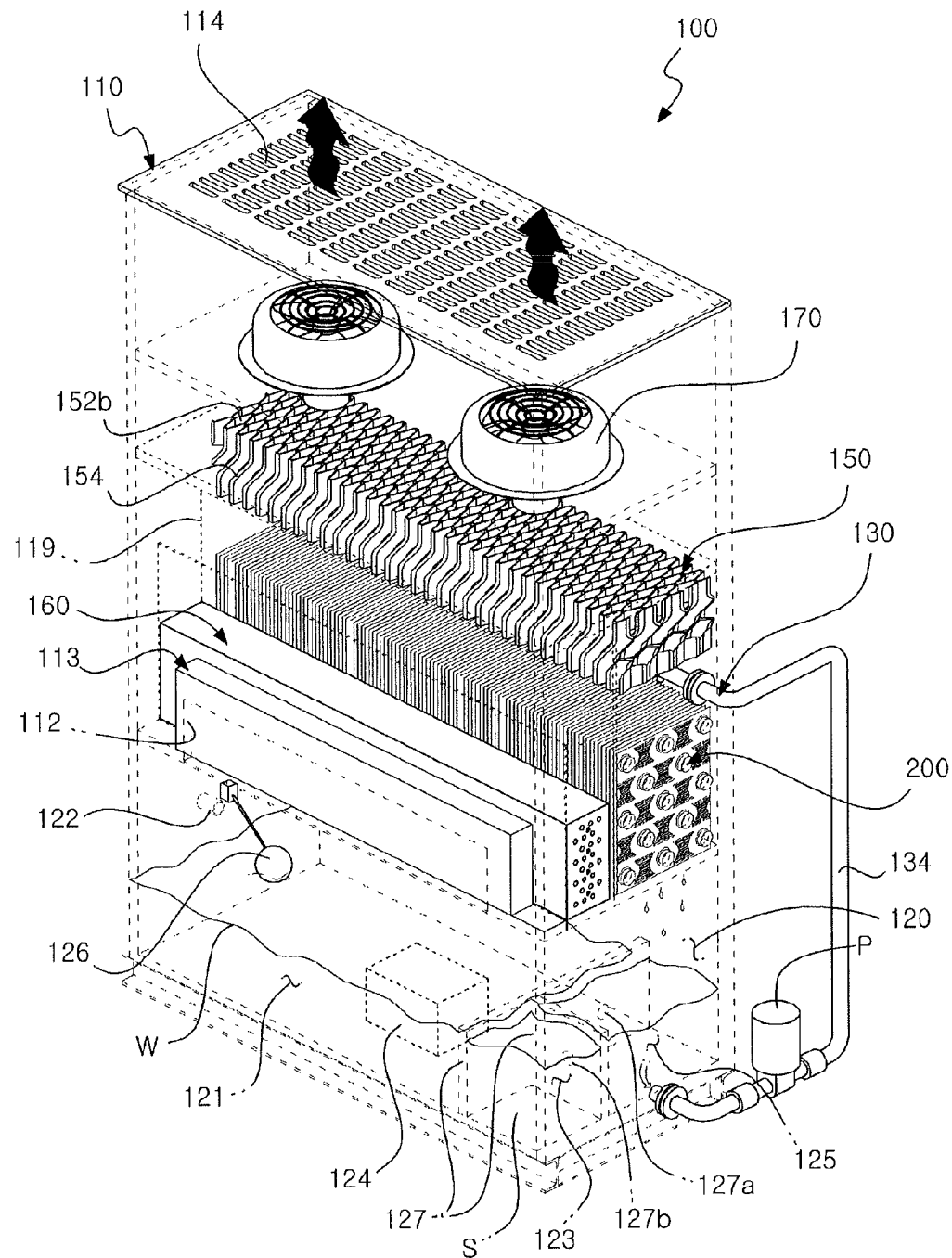
Figure 2A:
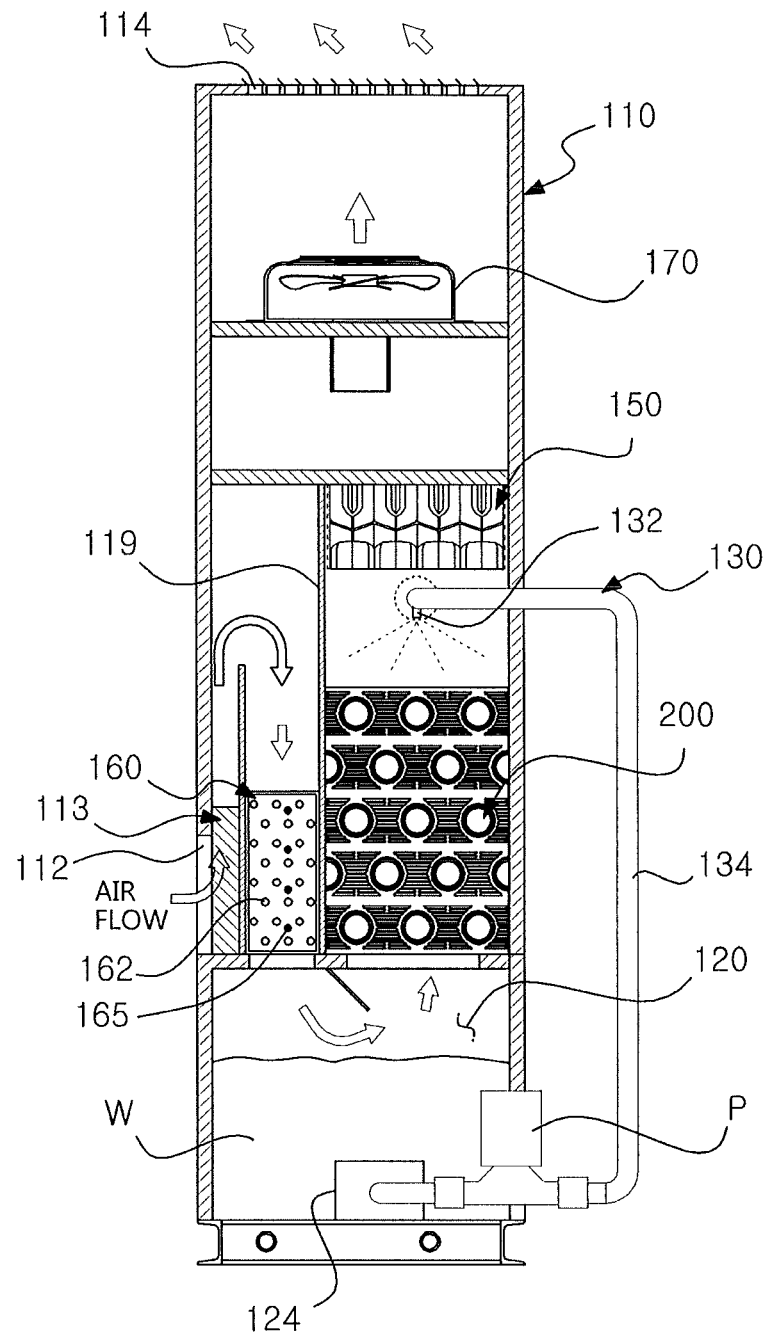
FIGS. 2a and 2b are a side sectional view and a front sectional view showing a forced evaporative humidifier using nano-vapor according to another embodiment of the present disclosure.
Figure 2B:
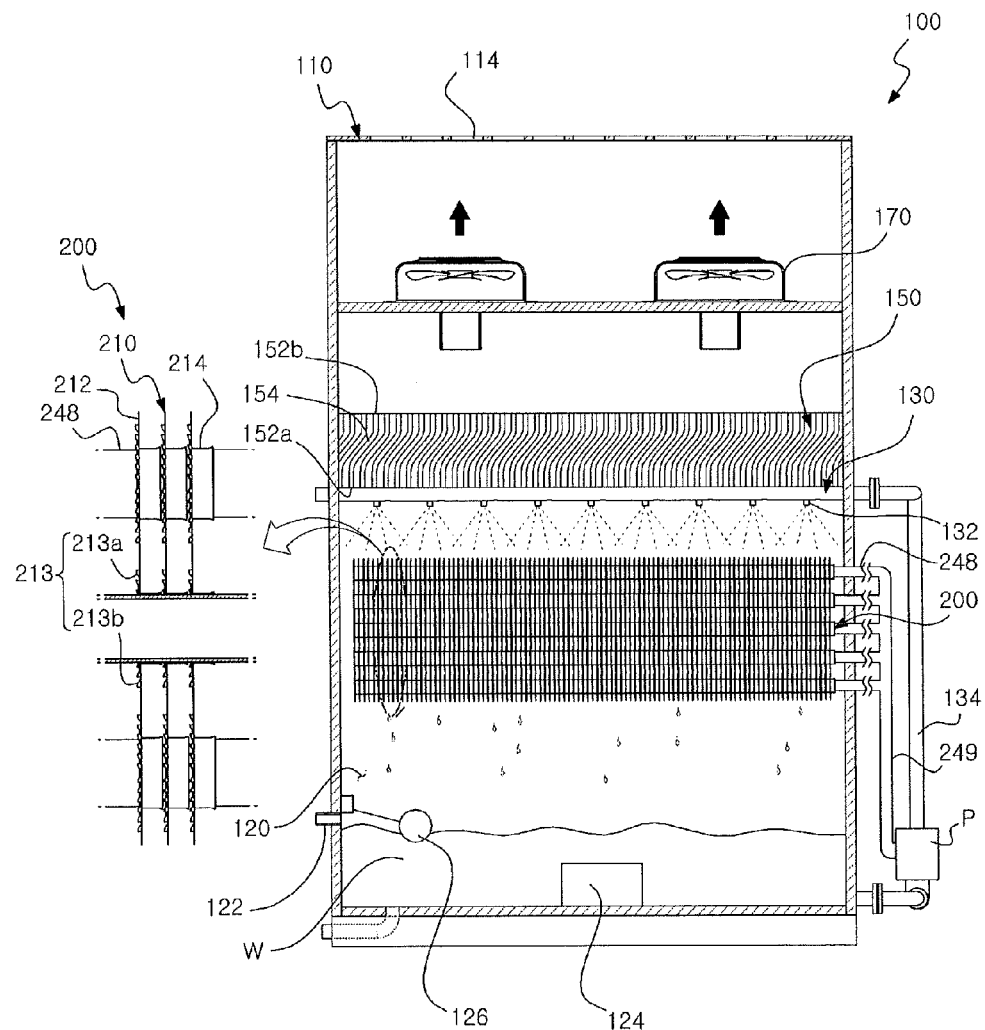

FIG. 1a is a perspective view showing a forced evaporative humidifier using nano-vapor according to an embodiment of the present disclosure, FIG. 1b is a perspective view showing a forced evaporative humidifier using nano-vapor according to another embodiment of the present disclosure, FIG. 2a is a side sectional view showing a forced evaporative humidifier using nano-vapor according to another embodiment of the present disclosure, and FIG. 2b is a front sectional view showing a forced evaporative humidifier using nano-vapor according to another embodiment of the present disclosure. FIGS. 2a and 2b depicts that a separation plate is not applied to a water tank of the forced evaporative humidifier using nano-vapor of FIG. 1b in order to clearly show a moving direction of liquid.

The forced evaporative humidifier using nano-vapor further includes a heat exchanger 160 installed at the suction port 112 to allow communication of a fluid.

A barrier 119 is formed at the housing 110 to separate the humidifying unit 200 and the heat exchanger 160 from each other so that water passing through the humidifying unit 200 does not flow into the heat exchanger 160.

The forced evaporative humidifier 100 using nano-vapor carries the water W stored in the water tank 120 to the injection nozzle 132 by using the pump P. The water W injected by the injection nozzle 132 drops to the humidifying unit 200 located below the injection nozzle 132. Since a plurality of films 210 having a thin design are provided to stand in the humidifying unit 200, the water W spreads wide to have a great surface area when flowing along the films 210 rather than dropping vertically. In addition, since the blowing fan 170 is located above the water tank 120, the humidifying unit 200, the injection unit 130, and the eliminator 150, if the blowing fan 170 is operated to blow an air toward the exhaust port 114 of the housing 110, a forced convection by the blower allows the air out of the housing 110 to pass through the film 210 of the humidifying unit 200 via the suction port 112 of the housing 110. Here, a part of the water W passing through the humidifying unit 200 is not evaporated but drops down to the water tank 120. While the water W in a liquid state is flowing into the water tank 120, if the air flowing into the suction port 112 meets the water W, contaminants contained in the water W are absorbed to the water. Therefore, the humid air discharging to the exhaust port 114 is in a clearer state in comparison to the air flowing into the suction port 112.

In addition, in order to prevent dust in the air flowing into the suction port 112 from flowing into the forced evaporative humidifier using nano-vapor, a dust-removing filter 113 may be mounted to the suction port 112. In other words, even though contaminants may be washed out by water by making the contact to come into contact with water, it is also possible to remove contaminants before dust in the air flowing into the housing 110 through the suction port 112 contacts the water. Here, by installing the dust-removing filter 113 over the entire area of the suction port 112, the entire air flowing into the housing 110 may be used for humidification after passing through the dust-removing filter 113. Here if a HEPA filter or the like is used as the dust-removing filter 113, the air may be sterilized and purified, and the water may contact the purified air and thus be supplied to the injection nozzle 132 in a more purified state in comparison to the case where the water contacts a non-sterilized air.

The air passing through the suction port is temperature-controlled while passing through the heat exchanger 160. Therefore, since the temperature-controlled air is directly used for humidification while passing through the humidifying unit 200, the humidification is performed while the water is converted into vapor as much as receivable.

In the forced evaporative humidifier 100 using nano-vapor, the inner air circulating indoors or mixed with an external air may be supplied to the heat exchanger 160. However, if the heat exchanger 160 performs cooling during this process, the temperature of the temperature-adjusting coil 162 may be lowered below the temperature of the air flowing into the heat exchanger, which may form frost at the temperature-adjusting coil 162. The forced evaporative humidifier 100 using nano-vapor according to the present disclosure performs a defrosting process at a suitable time to prevent excessive ice formation at the temperature-adjusting coil 162 and thus enhance the cooling efficiency. In other words, by installing a defrosting machine 165 at the heat exchanger 160, it is possible to prevent ice crystal from being excessively formed at the outer side of the temperature-adjusting coil 162. The defrosting machine 165 may be installed in the heat exchanger 160 in various ways. For example, as shown in FIG. 2a, a rod-shaped heat wire may be formed between the temperature-adjusting coils 162 to install the defrosting machine 165 in an electric heater type.

In addition, the heat exchanger 160 is separated from the injection unit 130 and the humidifying unit 200 for agreeable operation. In other words, while a cooling process is performed, if the water sprayed through the injection nozzle 132 makes a direct contact with the heat exchanger 160, an ice may be formed at the surface of the heat exchanger 160. In addition, during a defrosting process, if the heat exchanger 160 contacts water, an electric circuit of the defrosting machine 165 using a heat wire may cause a short circuit. Therefore, the heat exchanger 160 is separated from the humidifying unit 200 and the injection unit 130. In other words, by forming the barrier 119 at the housing 110, the water discharging from the injection unit 130 or the water passing through the humidifying unit 200 does not flow into the heat exchanger 160. In a state where the heat exchanger 160 formed at the suction port is separated from water in a liquid state as described above, the air is firstly temperature-controlled and then a humidifying process is suitably performed according to the state of the air. Therefore, the forced evaporative humidifier using nano-vapor according to the present disclosure may prevent a dew condensation even though a humidifying process is performed to a high humidity. In addition, by forming the heat exchanger 160 not to contact the water passing through the injection unit 130 or the humidifying unit 200, it is possible to enhance the temperature-adjusting effect of the heat exchanger 160 and the durability of the devices.

In addition, a sterilizing solution S may also be supplied to the water tank together with the water W. At this time, the sterilizing solution S may be stored in the entire water tank, but a sterilizing solution storage unit 123 may also be separately provided so that the sterilizing solution is supplied to the transfer tube 134. Here, even though the sterilizing solution storage unit 123 may be provided in a separate space, a separation plate 127 may also be provided at the water tank so that the water tank is partitioned and the sterilizing solution S is stored in one of partitioned spaces. First, according to an embodiment of the present disclosure, the water tank is partitioned by the separation plate 127, and the water tank partitioned by the separation plate 127 includes a water storage unit 121 for storing the water W, and a supplied water storage unit 125 communicating with the transfer tube 134 so that the sterilizing solution or the water in the water storage unit 121 is supplied thereto. Here, the separation plate 127 may have a T-shaped form and partition the water tank into three regions as necessary. The water tank partitioned into three regions by the separation plate 127 may further include a sterilizing solution storage unit 123 for storing a sterilizer together with the water storage unit 121 and the supplied water storage unit 125. At this time, the separation plate 127 may have a water supply port 127a communicatively formed between the water storage unit 121 and the supplied water storage unit 125 to be openable and closeable and a sterilizing solution supply port 127b communicatively formed between the sterilizing solution storage unit 123 and the supplied water storage unit 125 to be openable and closeable so that a required liquid may be supplied to the supplied water storage unit 125. Here, the sterilizer may be at least one selected from the group consisting of oxygenated water, chlorine dioxide water, hypochlorous acid water, ozone water, a tetravalent ammonium chloride solution, and electrolyzed water.

In addition, the pump for transferring a supplied liquid such as a sterilizing solution to the transfer tube 134 may be provided at an outside of the water tank as shown in FIGS. 1 and 2, but an underwater pump which operates in a state of submerging in the supplied liquid may also be used. Since the underwater pump may operate only in a state of submerging in a supplied liquid, it is possible to use a minimal amount of the expensive sterilizing solution so that the sterilizing solution may be stored in a clean state when not in use, and the pump may also maintain a state of submerging in the sterilizing solution. For this, when the underwater pump is applied to the supplied water storage unit 125, the volume of the supplied water storage unit 125 may be minimized so that the underwater pump may maintain a state of submerging in the sterilizing solution while using a small amount of sterilizing solution. In addition, a cover is provided at the upper portion of the sterilizing solution storage unit 123 so that a sterilizing solution or water dropping from the above does not flow therein, and the sterilizing solution may be supplied to the supplied water storage unit 125 as much as the evaporated amount of the sterilizing solution. Here, the cover may be controlled to open or close according to the kind of a circulating supplied liquid. For example, when the sterilizing solution is circulating, the cover may also be provided at the upper portion of the water storage unit.

At this time, the water tank stores a liquid to be evaporated, and the liquid is not limited to water but may also be applied to a sterilizing solution.

Water and air are continuously evaporated and liquefied. In other words, water is continuously converted into vapor, and vapor is continuously converted into water. According to the ratios of both conversions, it is determined how fast water is evaporated. These rations are determined according to a relative humidity of the air which is in contact with the surface of water. Here, the relative humidity of the air has relations with an absolute amount of the vapor and a temperature of the air. Since the wind means that air molecules are transferred due to the difference of atmospheric pressures, if there is a wind, vapor also moves together. Therefore, if the wind rises, the air in contact with the liquid is exchanged with new air. The air newly supplied as described above has not been in contact with the liquid and thus has a lower absolute humidity in comparison to the air which has been in contact with the liquid, thereby also lowering a relative humidity. Therefore, if the new air comes in contact with water, the evaporation is easily performed. For this reason, in the forced evaporative humidifier 100 using nano-vapor according to the present disclosure, the water W having an increase surface area while flowing along the film 210 meets the air passing through the film 210 and is evaporated into vapor. Therefore, the air emitted to the exhaust port 114 has a greater relative humidity in comparison to the air flowing into the suction port 112.

Here, the blowing fan 170 is provided above the eliminator 150 to easily discharge the air in which moisture increases. The blowing fan 170 has different wind speeds at its front and rear sides. In other words, at the front side of the blowing fan 170 at which the wind discharges, air introduced in various directions at the rear side of the blowing fan 170 is collected and discharged, and thus the wind speed at the front side of the blowing fan 170 is greater than the wind speed at the rear side of the blowing fan 170. Based on such a characteristic of the blowing fan 170, a location of the blowing fan 170 at the forced evaporative humidifier 100 using nano-vapor according to the present disclosure will be described below. For example, if the blowing fan 170 is located below the humidifying unit 200, due to a fast wind speed, the time for the water W to meet the air moving downwards along the film 210 is short, and thus the time for evaporating the water W is not ensured. Further, since the wind force is applied in a direction opposite to the gravity applied to the water W, this disturbs that the water W increases its contact surface while moving along the film 210. Therefore, since the surface area decreases even though the water W is exposed to the air during the same time, the evaporation efficiency of the water W deteriorates. Further, since the distance between the exhaust port 114 and the blowing fan 170 is great, the humidified air may not be easily discharged.

In addition, if the blowing fan 170 is located between the injection nozzle 132 and the humidifying unit 200, a part of the water W discharging through the injection nozzle 132 is not transferred to the humidifying unit 200 but is directly scattered toward the eliminator 150, thereby prohibiting active humidification. Also, in this case, since the amount of the water W supplied to the eliminator 150 increases, if an amount of water W supplied to the eliminator 150 increases over a quantity by which scattering of the water can be prevented, a part of the water W flowing into the eliminator 150 passes through the eliminator 150 and thus the water W is collected indoors. Therefore, the blowing fan 170 may be formed between the eliminator 150 and the exhaust port 114 so that a humidifying process may be smoothly performed and the humidified air may be easily supplied into the room. In other words, since the humidifying unit 200, the injection nozzle 132, and the eliminator 150 are located at the rear side of the blowing fan 170, even though the air moves upwards, the wind speed of the air does not increase not so to shift a moving direction of water drops upwards. Therefore, the air passing through the humidifying unit 200 sufficiently contacts the water W with an increased surface area without disturbing the increase of the contact surface of the water W, thereby ensuring the water W to be easily evaporated into vapor.

In addition, since the air passing through the eliminator 150 has a low speed, this prevents the water W from being mixed in the air and passing through the eliminator 150, and even though the water W is mixed in the air, the air moves at a low speed so that the air may discharge in a state of being separated from the water W while passing through the anti-scattering tube 154 of the eliminator 150. Therefore, the air containing only moisture is supplied to the rear side of the blowing fan 170, and the collected air discharges out of the housing 110 through the exhaust port 114, thereby preventing the water W from forming dew indoors.

A plurality of films 210 are installed at the humidifying unit 200, and as the number of the films 210 is greater, the surface area of the water W in contact with the air may increase. However, if the films are installed to have too small interval between the body surfaces 212, the air or water may not easily pass between the body surfaces 212, and thus the plurality of films 210 may be installed at suitable intervals. For this, the films 210 may be installed so that an interval between the body surfaces 212 is 1.9 mm to 2.5 mm. In other words, if the interval between the body surfaces 212 is smaller than 1.9 mm, the space through which the air may pass is too narrow, and thus the speed of the wind passing between the body surfaces 212 may rapidly increase due to the capillary phenomenon. In this case, due to too fast wind speed, the water W may not be easily evaporated into vapor. In addition, even though a capillary phenomenon does not occur, if the space is too narrow, the air may not easily flow, and water is collected into a water drop state between adjacent body surfaces 212. Therefore, the interval between the body surfaces 212 may be at least 1.9 mm. In addition, if the interval of the films 210 exceeds 2.5 mm, the surface area of the water W which may be in effective contact with the air decreases in comparison to the air volume passing through the humidifying unit 200, and thus the air may not be easily humidified. In other words, since the number of installable films 210 decreases, the place capable of increasing the surface area of the water W decreases, thereby resulting in inefficient humidification.

Therefore, the films 210 may be installed so that the interval between the body surfaces 212 is 1.9 mm to 2.5 mm.

Even though the number of films 210 capable of being installed at the humidifying unit 200 increases as the thickness of the body surface 212 is smaller, if the body surface 212 is formed too thin, its strength decreases and thus the durability of the humidifying unit 200 deteriorates. Therefore, the humidifying unit 200 may have the body surface 212 of a suitable thickness. For this, the body surface 212 may have a thickness of 0.1 mm to 0.5 mm. In other words, if the body surface 212 has a thickness smaller than 0.1 mm, due to the small thickness of the body surface 212, the air passing between the films 210 continuously gives impacts to the body surface 212, and thus when the forced evaporative humidifier 100 using nano-vapor is in operation, noise is generated at the humidifying unit 200. Moreover, the body surface 212 may be damaged, and the durability of the humidifying unit 200 may deteriorate. In addition, if the body surface 212 has a thickness greater than 0.5 mm, the strength of the film 210 is unnecessarily improved in comparison to the strength demanded at the humidifying unit 200, and thus the space for installing the film 210 is reduced. Therefore, the film 210 may have a thickness of 0.1 mm to 0.5 mm.

The injection nozzle 132 formed at the injection unit 130 may adopt various elements, particularly a spiral full-cone nozzle which may perform spraying easily even though dust is mixed in the air flowing into the housing 110. In particular, a nozzle having an injection angle of 90° to 120° is used so that the water may be uniformly sprayed to the humidifying unit 120. In other words, if the injection angle of the injection nozzle 132 is smaller than 90°, an empty space formed between threads is great, and thus even though several injection nozzles 132 are mounted to uniformly spray water to the humidifying unit 200, the water may be sprayed only to a partial portion of the humidifying unit 200. In addition, if the injection nozzle 132 has an injection angle exceeding 120°, water-sprayed regions of the injection nozzles 132 may excessively overlap with each other, which may disturb the flow of air in the humidifying unit 200. In addition, water drops sprayed into small particles may be gathered to increase the size of water drops, and thus an effect contact area with the air may decrease in comparison to the amount of sprayed water. Therefore, the injection nozzle 132 formed at the injection unit 130 may use a spiral full-cone nozzle having an injection angle of 90° to 120°.

The eliminator 150 includes an anti-scattering tube 154 so that an inlet 152a and an outlet 152b are provided at alternate locations in a vertical direction in order to prevent water drops included in the air from being scattered. Therefore, when the air containing the water W passes through the anti-scattering tube 154, the water W may be adhered to a bent portion of the anti-scattering tube 154, and only the air and the moisture contained in the air may pass through the eliminator 150. Here, if the inlet 152a and the outlet 152b have the same area, in order to maximize the area of the anti-scattering tube 154 of the eliminator 150, the inlet 152a and the outlet 152b may have a hexagonal shape. In other words, the anti-scattering tube 154 provided between the inlet 152a and the outlet 152b has a hexagonal tube shape. Therefore, the water W contained in the air may be effectively removed.

The water W sprayed by the injection nozzle 132 is supplied from the water tank 120 located at a lower portion of the housing 110. Therefore, the water W in the water tank 120 gradually decreases as time goes, and in the present disclosure, a water feeding unit 122 may be provided so that water may be supplied to always maintain the quantity of water in the water tank 120 over a predetermined level. Here, the water feeding unit 122 may manually supply the water W, and by providing a floating valve 126 at the water tank 120, the water feeding unit 122 may be opened if the water W in the water tank 120 decreases below a predetermined level so that the water W flows into the water tank 120. In other words, the floating valve 126 having a float flowing on the water W opens the water feeding unit 122 to supply the water W into the water tank 120 if the float moves downwards, and if the float moves to a predetermined height, the floating valve 126 closes the water feeding unit 122 to stop the supply of the water W into the water tank 120.

In addition, the water tank 120 may further include a sterilizer 124 for controlling bacterial multiplication and removing bacteria, in order to prevent bacteria contained in the air from contacting and contaminating the water W through continuous circulation of the water W. In other words, the water W flowing into the water tank 120 as the humidifying unit 200 moves downwards flows into the water tank 120 while absorbing contaminants of the air flowing into the forced evaporative humidifier 100 using nano-vapor, and even though the water containing contaminants flows into the water tank 120 as described above, it is possible to prevent bacteria or virus from proliferating in the water of the water tank 120. In addition, by sterilizing the water as described above, it is possible to prevent fur from forming between the films 210, which may allow the air to smoothly flow between the humidifying units 200 for a long time. In other words, if the sterilized water W is supplied through the injection nozzle 132 to the humidifying unit 200, the humidifying unit 200 is sterilized by the sterilized water W. In addition, in addition to the sterilization of the humidifying unit 200 by the sterilized water W, the surface of the film 210 may be treated to have an antibiotic property, which may prevent bacteria from being adhered in the air while the air is humidified.

Here, the sterilizer 124 may be configured in various shapes, for example a sterilizer 124 for irradiating UV rays into the water tank 120 to sterilize the water W or a sterilizer 124 for converting the water in the water tank 120 into an electrolyzed water by electrolyte to sterilize the water W. In another case, an ozone water generator for converting water into ozone water by dissolving an ozone gas in the water W may be provided at the sterilizer 124 to convert the water W in the water tank 120 into ozone water. The ozone water instantly kills bacteria and virus, kills molds, Algae spore, yeast fungi or the like, oxidizes heavy metals, iron, manganese, phenol or the like, remove chromaticity and control the growth of THM. Moreover, the ozone water is not harmful against a human body in spite of its strong sterilizing ability.

Further, a solution having a sterilizing ability and not harmful against a human body may be diluted therein and supplied together.

If the spacer 214 having a tube shape is provided at the body surface 212, the humidifying unit 200 may further include a coupling tube 248 for coupling a plurality of films 210 together, as shown in FIG. 2. Here, the coupling tube 248 allows the plurality of stacked films 210 to be fixed at a location of the humidifying unit 200 without being distorted. Here, the coupling tube 248 may be configured to allow the water W of the water tank 120 to circulate therein.

Meanwhile, the water tank 120 may have a constant temperature coil (not shown) to prevent the water in the water tank 120 from being cooled below a predetermined temperature. In other words, if the water in the water tank 120 keeps circulating to lower its temperature, the constant temperature coil is operated to raise the temperature to a target level. By using the constant temperature coil as described above, it is possible to prevent the temperature of the water sprayed by the injection nozzle 132 from being cooled too much and also maintain the temperature of the water flowing in the coupling tube 248 so that the films 210 are not frozen. Here, each coupling tube 248 is coupled to a melt water tube 249, which is directly supplied with the water of the water tank 120 from the pump, to allow communication of fluid.

Figure 3:
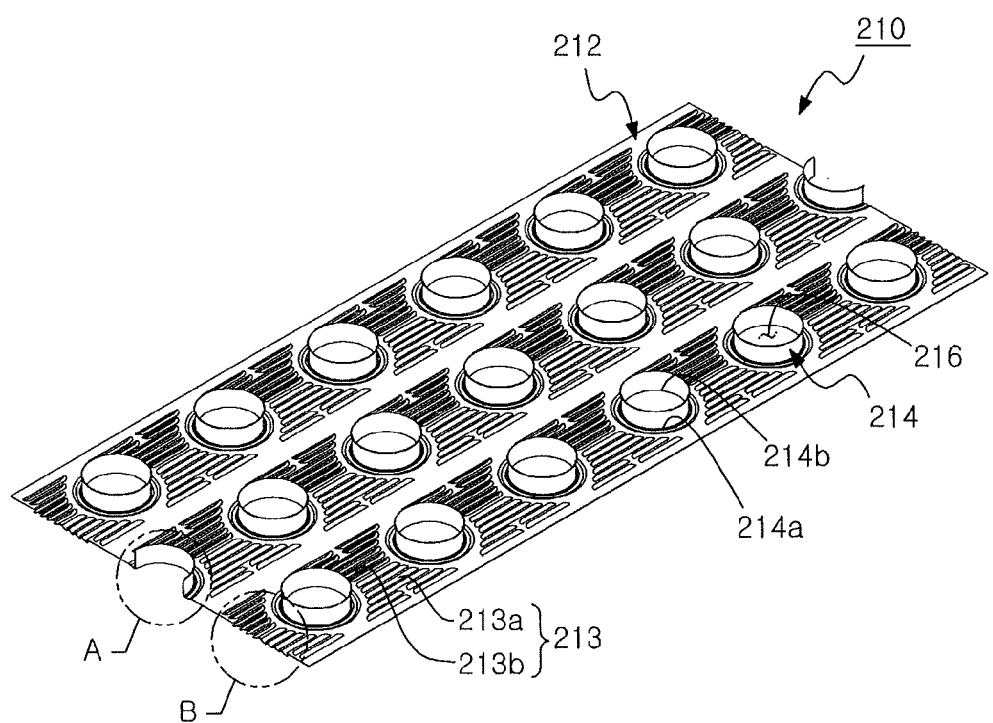
FIG. 3 is a perspective view showing a film according to an embodiment of the present disclosure.
Figure 4:
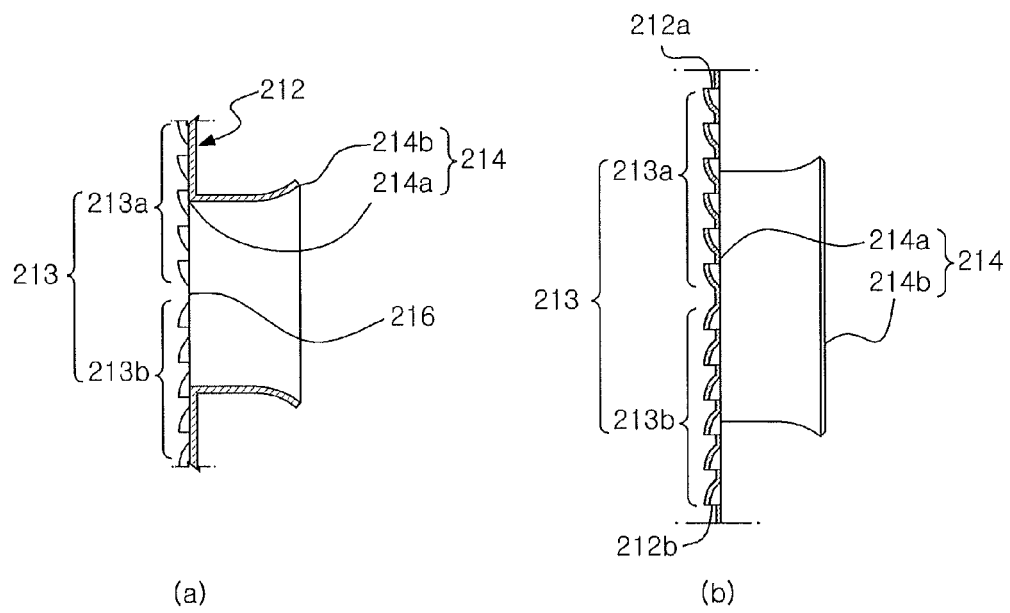
FIGS. 4a and 4b are cross-sectional views taken along the lines A and B of FIG. 3.

FIG. 3 is a perspective view showing a film according to an embodiment of the present disclosure, FIG. 4a is a cross-sectional view taken along the line A of FIG. 3, and FIG. 4b is a cross-sectional view taken along the line B of FIG. 3.

The spacer 214 formed at the film 210 not only constantly maintains an interval between the films 210 but also extends a channel of air passing between the films 210. Like this, in order to extend the channel of air, the spacers 214 may be arranged alternately in a vertical direction on the same film 210. In other words, based on one spacer 214, spacers 214 located above and below the reference spacer are arranged so that their centers are dislocated in a vertical direction, so that the channel is changed by the spacers 214 and thus the air moves between the films 210 in a longer path in comparison to the vertical length of the film 210. Therefore, even though the same amount of air passes between the films 210, the amount of humidification may be further increased.

For example, when spacers 214 are formed in three horizontal rows as shown in FIG. 3, spacers 214 located at the even-number rows and spacers 214 located at the odd-number rows are formed alternately. In other words, the spacers 214 located at the even-number rows are located above and below the spacers 214 located at the odd-number rows. Namely, when the films 210 are provided to stand on the humidifying unit 200, one spacer 214 is arranged so that its center is dislocated from the centers of other spacers 214 located above and below the spacer 214. In addition, the body surface 212 is provided between the spacers 214, and slots 213 classified into a first slot 213a and a second slot 213b according to their shapes are formed in the body surface 212.

The spacer 214 formed at the body surface 212 of the present disclosure has one end 214a and the other end 214b. One end 214a of the spacer 214 is connected to the body surface 212, and a through hole 216 may be formed at the body surface 212 where the spacer 214 is formed, at a location of the spacer 214 as shown in FIG. 4a. The spacer 214 is provided so that the plurality of films 210 stacked in a lateral direction may maintain their intervals constantly from each other. Therefore, the other end 214b of the spacer 214 has a greater diameter than one end 214a of the spacer 214, and the body surfaces 212 of adjacent films 210 may maintain a constant interval from each other. Besides the different diameters of one end 214a and the other end 214b of the spacer 214, the spacer 214 may be formed in any configuration if one spacer 214 of the film 210 is not inserted into another spacer 214.

Here, a plurality of slits 213 cut in a horizontal direction are formed between one pair of spacers 214 adjacent to each other in a horizontal direction. At this time, in addition to forming the slit 213, in the present disclosure, the portion where the slit 213 is formed is provided to protrude as shown in FIG. 4b, so that air may more easily flow in a front and rear direction of the body surface 212. In other words, the plurality of slits 213 are formed to include a first slit 213a which forms cut positions 212a of the body surface 212 to protrude in an upper direction of the body surface 212 and a second slit 213b which forms a cut position 212b of the body surface 212 to protrude in a lower direction of the body surface 212. Here, the first slit 213a and the second slit 213b may be installed at any locations according to their purposes, and in one embodiment of the present disclosure, the first slit 213a and the second slit 213b are formed together in a single horizontal row.

Figure 5:
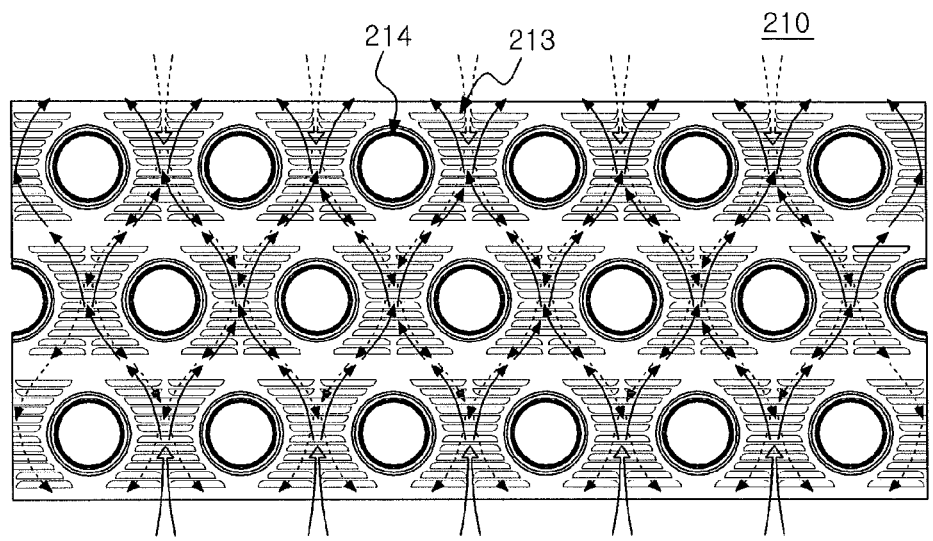
FIGS. 5a and 5b are schematic views showing the flow of air and water flowing along the film according to an embodiment of the present disclosure.
Figure 5:
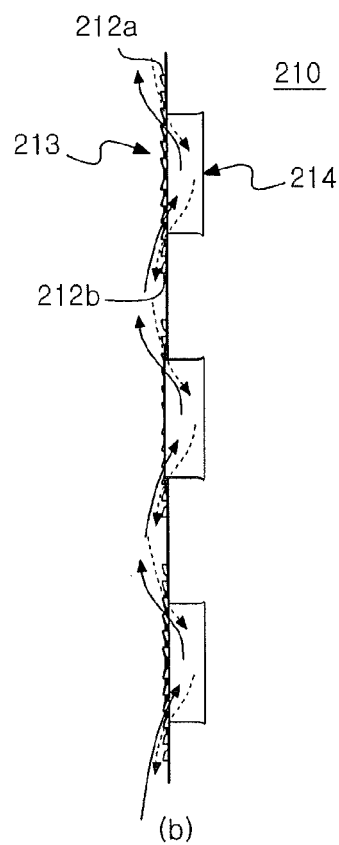

FIGS. 5a and 5b schematically show the flow of air and water flowing along the film.

The air flowing from the lower portion of the film 210 to the upper portion thereof has an extended moving path due to the spacer 214 as shown in FIG. 5a. Similarly, the water moving from the upper portion of the film 210 to the lower portion thereof also has an increased moving path due to the spacer 214. In other words, as the moving path of water increases, the surface area of the water capable of contacting the air increases, and as the moving path of air increases, the time capable of contacting the water moving along the film 210 of the humidifying unit 200 also increases. Therefore, even though the same amount of air flows, the air may contact the water for a long time due to the spacer 214, which makes it possible to humidify the indoor space to a high humidity level even at a low temperature.

The slit 213 also increases the flowing path of air and water, similar to the spacer 214. Even though the spacer 214 increases a vertical moving path of the film 210, the slit 213 allows the air and water to flow through the body surface 212 as shown in FIG. 5b. Therefore, the air and water may move in a front and rear direction of the body surface 212. In other words, the wind passing through the second slot 213b moves upwards while passing through the first slot 213a, and the water W passing through the first slot 213a moves downwards while passing through the second slot 213b. Therefore, the air and water flows in a front and rear direction of the body surface 212 and thus the air contacts the water for a long time. For this reason, the indoor space may be humidified to a high humidity level even at a low temperature. The forced evaporative humidifier using nano-vapor according to the present disclosure may be installed at any place which requires air conditioning, without being limited to an agricultural product storehouse. In other words, the present disclosure may be applied to any place such as an office, a work place, a hospital, a semiconductor factory, a medical firm, a laboratory, a cold store, a clean room or the like.

Figure 6A:
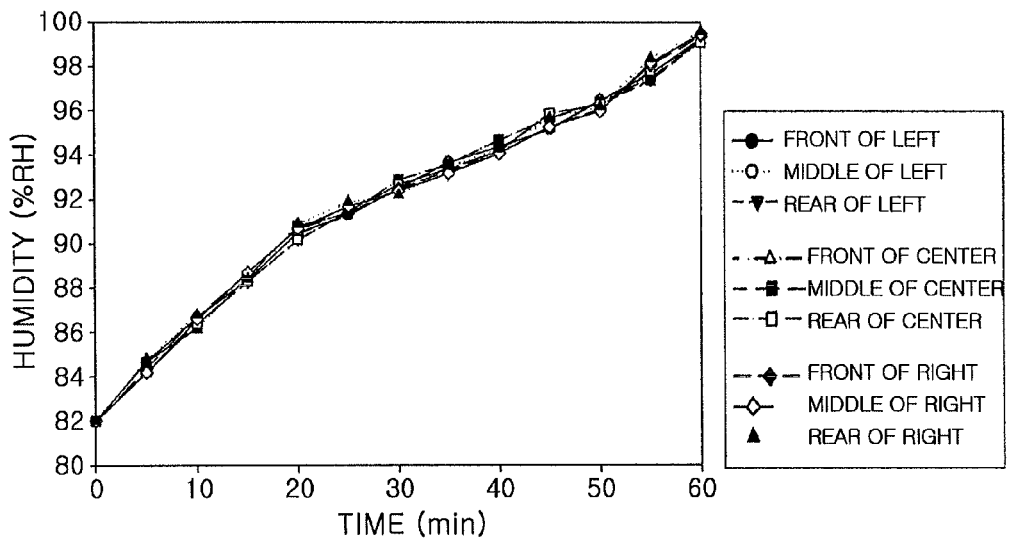
FIGS. 6a to 6c are graphs showing relative humidity at Example of Experimental Example 1.
Figure 6B:
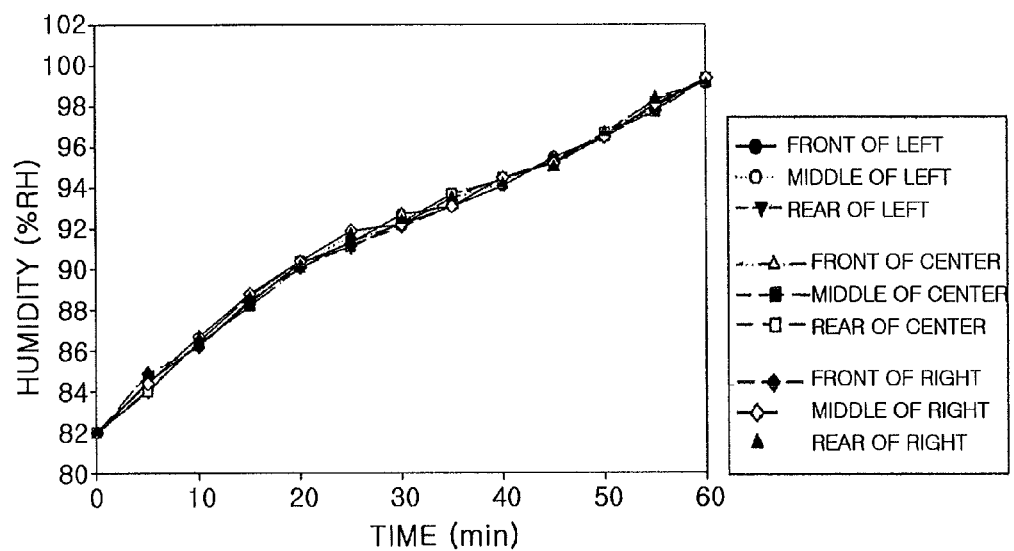
Figure 6C:
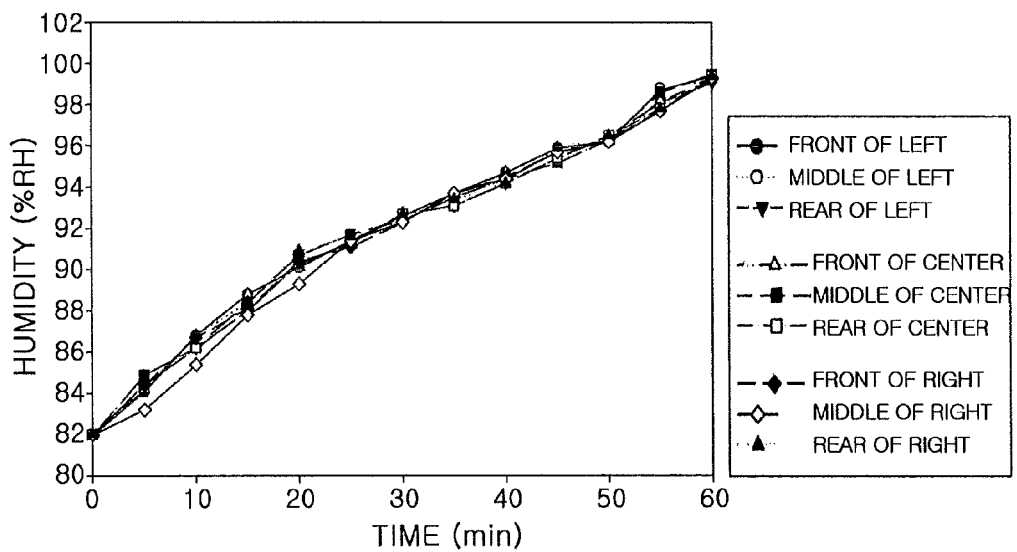
Figure 7A:
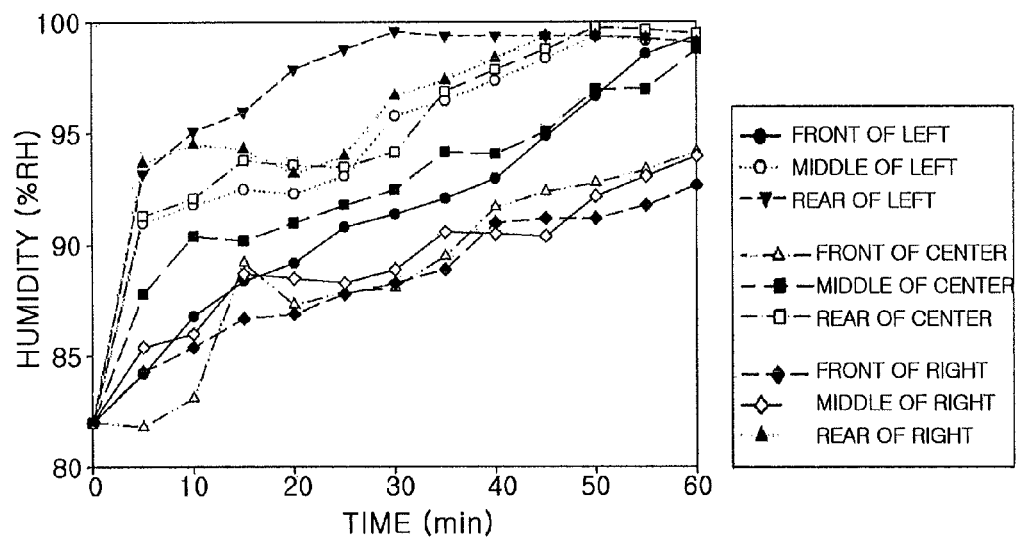
FIGS. 7a to 7c are graphs showing relative humidity at Comparative Example 1 of Experimental Example 1.
Figure 7B:
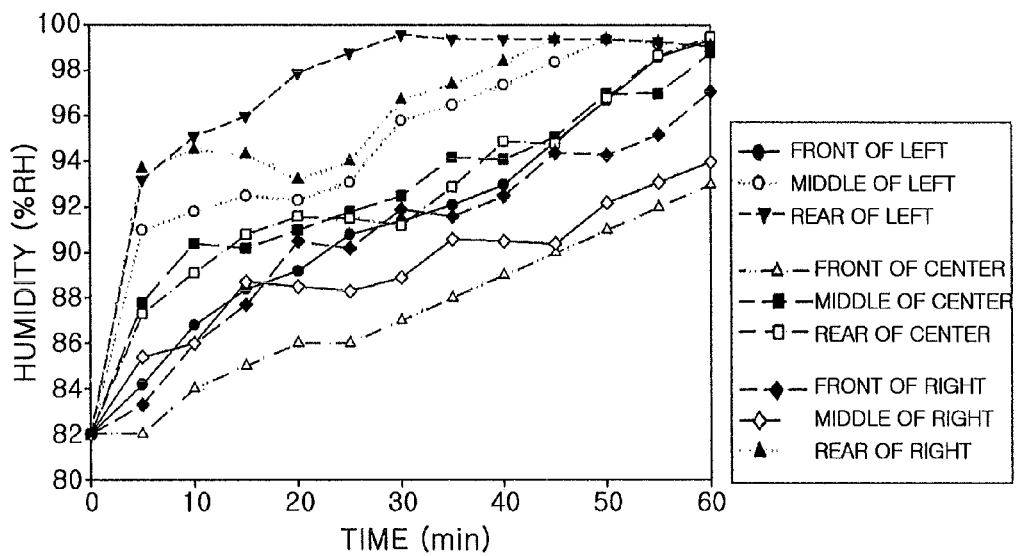
Figure 7C:
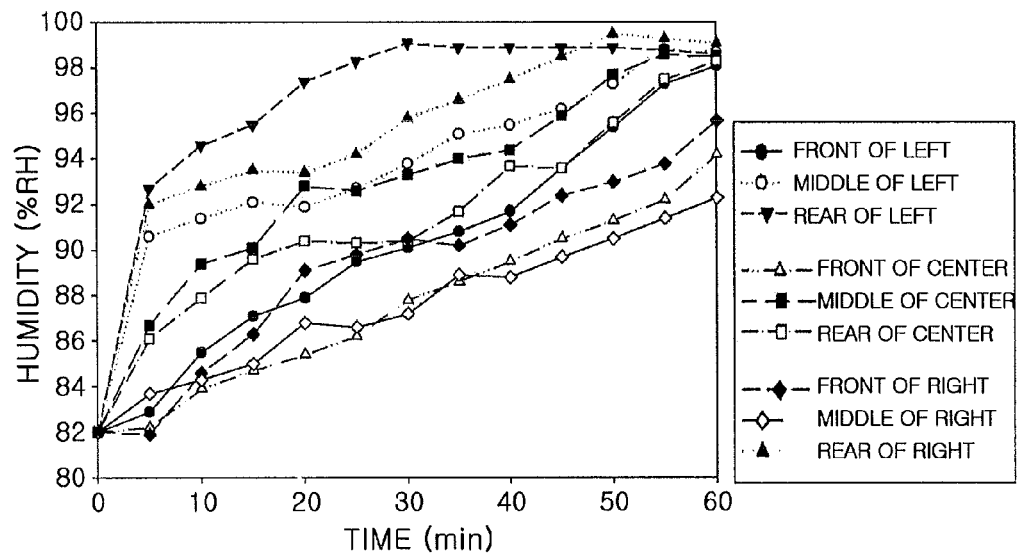
Figure 8A:
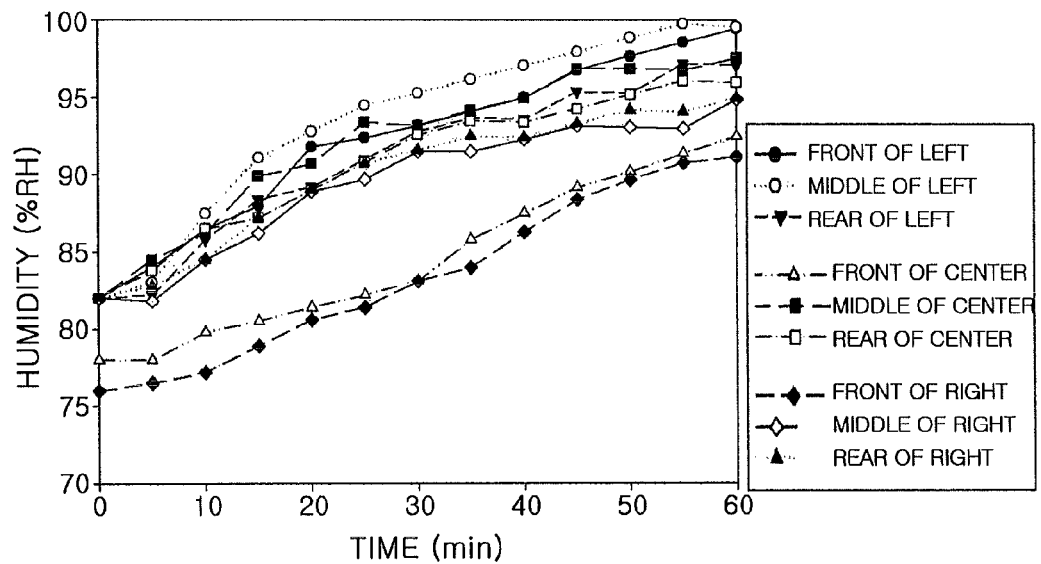
FIGS. 8a to 8c are graphs showing relative humidity at Comparative Example 2 of Experimental Example 1.
Figure 8B:
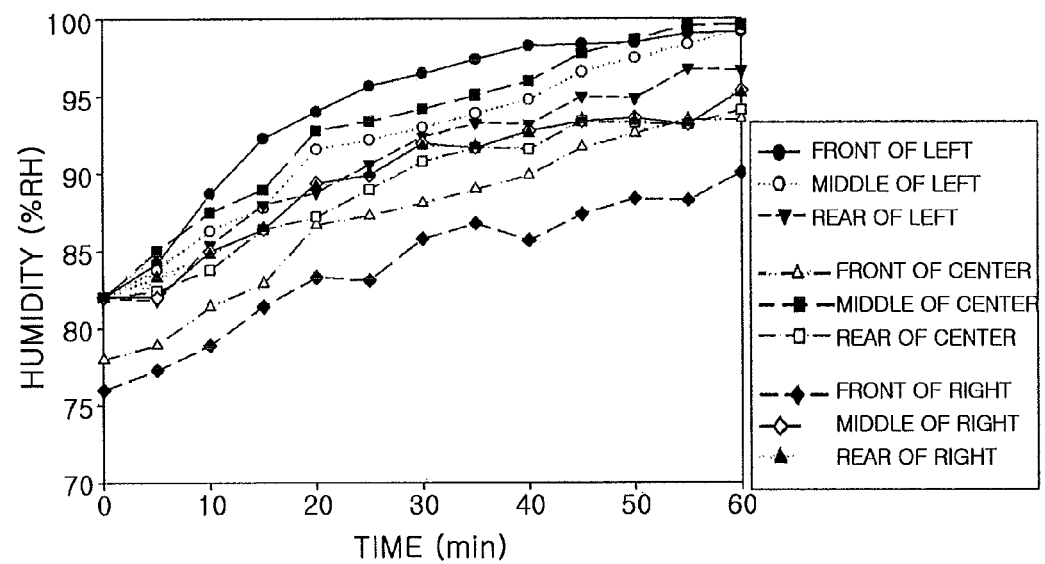
Figure 8C:
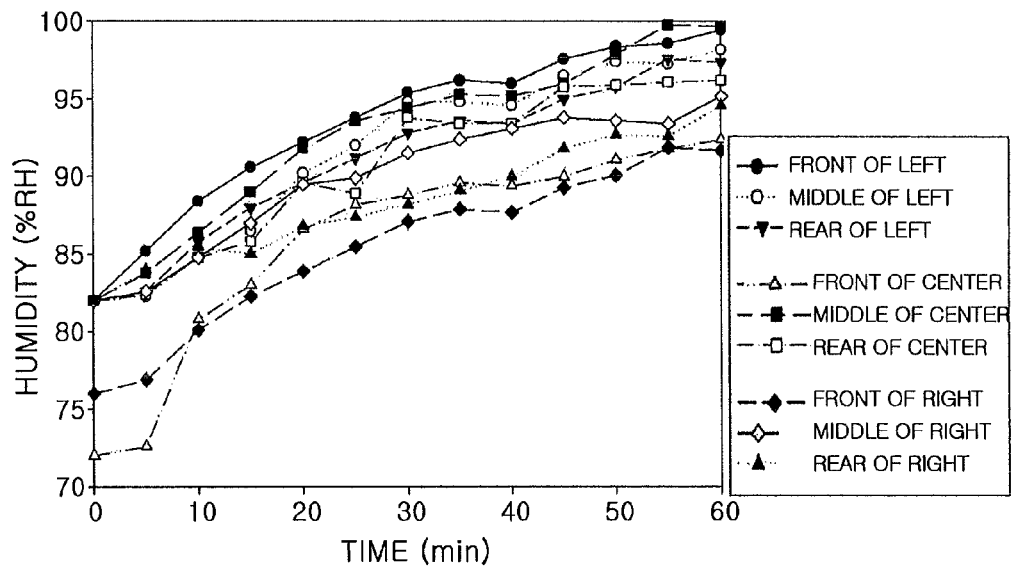
Figure 9A:
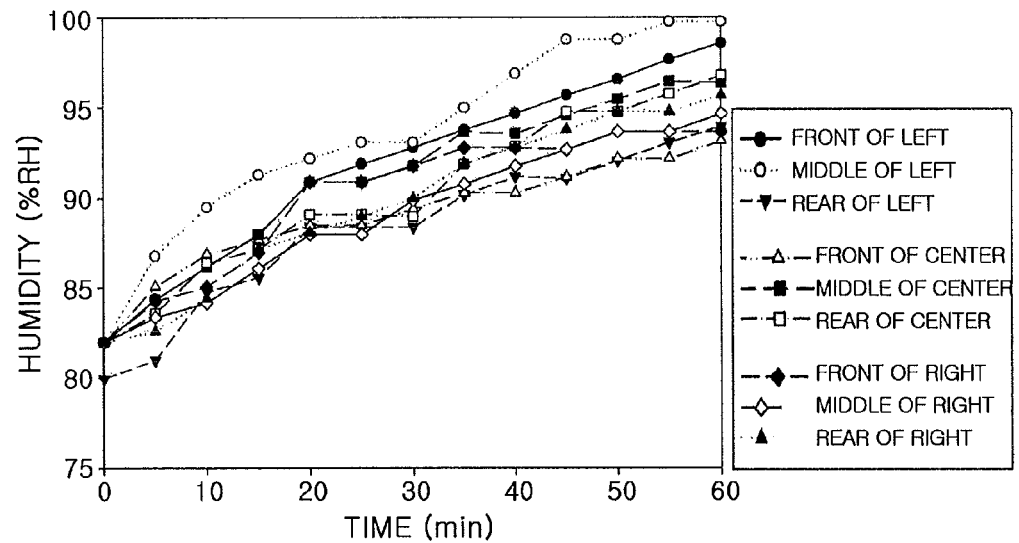
FIGS. 9a to 9c are graphs showing relative humidity at Comparative Example 3 of Experimental Example 1.
Figure 9B:
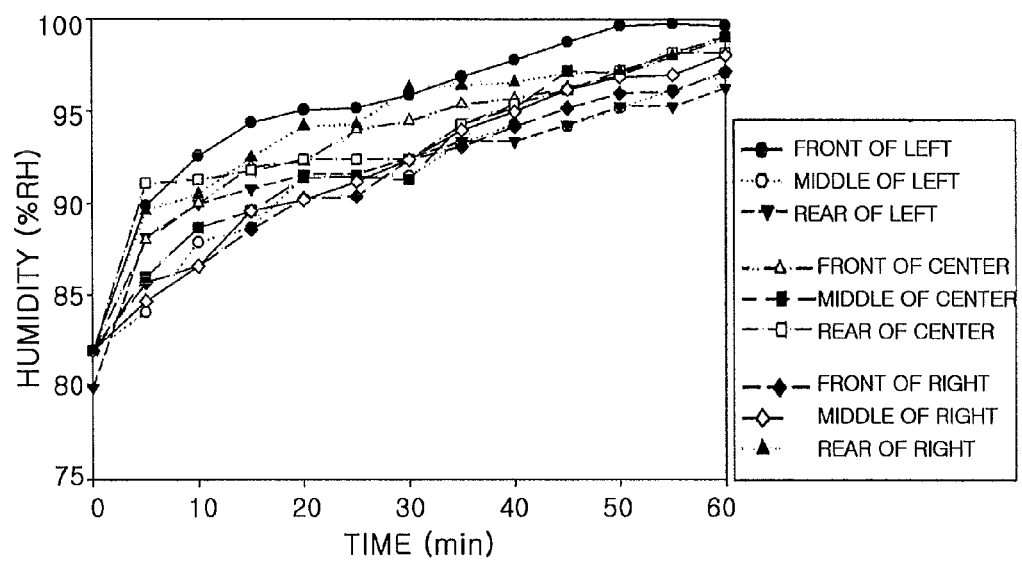
Figure 9C:
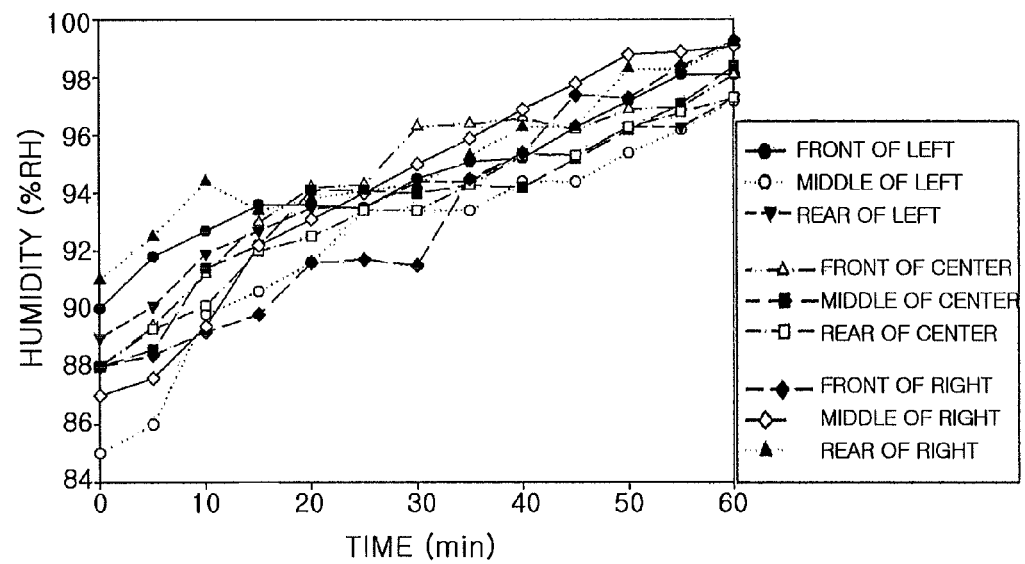
Figure 10:
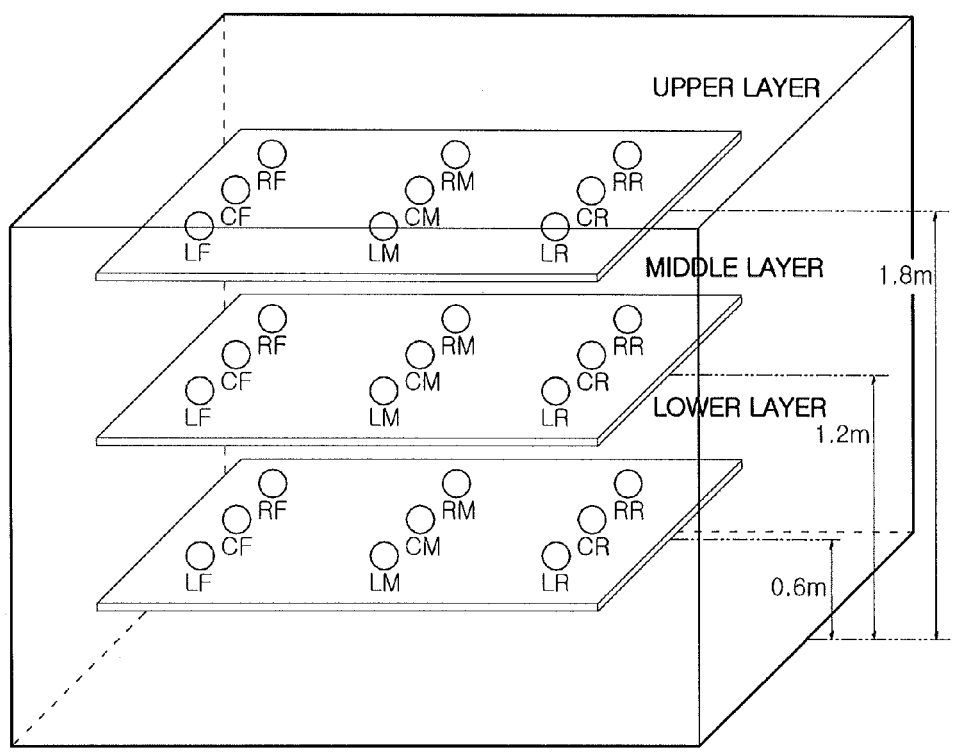
FIG. 10 is a schematic view showing relative humidity measurement locations in a storehouse.

FIGS. 6a to 6c are graphs showing relative humidity of the forced evaporative humidifier using nano-vapor according to an embodiment of the present disclosure, FIGS. 7a to 7c are graphs showing relative humidity a heating humidifier according to a comparative example, FIGS. 8a to 8c are graphs showing relative humidity of a centrifugal humidifier according to a comparative example, FIGS. 9a to 9c are graphs showing relative humidity of an ultrasonic humidifier according to a comparative example, and FIG. 10 is a schematic view showing relative humidity measurement locations according to examples and comparative examples.

1) Experimental Example 1

A relative humidity was measured in a storehouse which was fabricated with keystone panels, namely uneven polyurethane panels for a cold store and has an outer configuration of 5250 mm in length, 3850 mm in width and 2850 mm in height and an inner configuration of 5030 mm in length, 3630 mm in width and 2630 mm in height. In the experiment, at the storehouse having a cooling machine at a front side thereof, the forced evaporative humidifier using nano-vapor was operated for one hour, and the humidity at each point in the storehouse was measured. The relative humidity was measured at nine points, respectively in an upper layer, a middle layer and a lower layer in the storehouse. The lower layer is at a height of 0.6 m from the bottom, the middle layer is at a height of 1.2 m from the bottom, and the upper layer is at a height of 1.8 m from the bottom. The nine points are uniformly set in a region from an installation point of the forced evaporative humidifier using nano-vapor to an opposite wall, and relative humidity was measured at every point. The nine points where relative humidity was measured were respectively classified into LF (Front of Left), CF (Front of Center), RF (Front of Right), LM (Middle of Left), CM (Middle of Center), RM (Middle of Right), LR (Rear of Left), CR (Rear of Center), and RR (Rear of Right). Nine points are respectively measured at the upper layer, the middle layer and the lower layer, and then the relative humidity of the nine points in each layer was shown in a graph. In addition, each point where relative humidity was measured is depicted in FIG. 10.

Example

A forced evaporative humidifier using nano-vapor having a film-type humidifying unit as shown in FIG. 2 was used, and a STF12 nozzle produced by KUKJE NOZZLE was selected as the nozzle. At this time, the nozzle had an allowable injection angle of 120° and an injection pressure of 0.7 kg/cm$^2$. The installation location in the storehouse was a center spaced apart from the front wall by 225 mm.

Comparative Example 1

Comparative Example 1 used a heating humidifier, and the heating humidifier was a CompactLine model produced by HygroMatik in German. The installation location in the storehouse was identical to that of the Example above.

Comparative Example 2

Comparative Example 2 used a centrifugal humidifier, and the centrifugal humidifier was a model HR-25 produced by FARAN INDUS. The installation location in the storehouse was identical to that of the Example above. It is not desirable to install the centrifugal humidifier near a cooling machine since water is injected as fine particles. However, for the comparison with the forced evaporative humidifier using nano-vapor according to the present disclosure, the centrifugal humidifier was installed at the same location as the forced evaporative humidifier using nano-vapor of the Example.

Comparative Example 3

Comparative Example 3 used an ultrasonic humidifier, and the ultrasonic humidifier was a model DLE-US-06 produced by Htech (or, Dongrim Engineering). The installation location in the storehouse was at a center of the left wall located at a height of 2015 mm from the bottom. Since the ultrasonic humidifier sprays water into fine particles, it is installed at a side portion, instead of a front portion where a cooling machine is located. In other words, the ultrasonic humidifier is installed at a location capable of optimally humidifying the storehouse.

Relative Humidity Measurement Results

The relative humidity at each point according to the Example and Comparative Examples 1, 2 and 3 is shown in Tables 1 to 4. The forced evaporative humidifier using nano-vapor according to the present disclosure is recorded as a developed forced evaporative humidifier using nano-vapor. In addition, the content of Table 1 is depicted as a graph in FIG. 6, the content of Table 2 is depicted as a graph in FIG. 7, the content of Table 3 is depicted as a graph in FIG. 8, and the content of Table 4 is depicted as a graph in FIG. 9.

TABLE 1

|  | (min) | LF | LM | LR | CF | CM | CR | RF | RM | RR |
|---|---|---|---|---|---|---|---|---|---|---|
| developed upper layer | 0 | 82.0 | 82.0 | 80.0 | 82.0 | 82.0 | 82.0 | 82.0 | 82.0 | 82.0 |
|  | 5 | 84.7 | 84.7 | 84.2 | 84.7 | 84.7 | 84.2 | 84.4 | 84.2 | 84.8 |
|  | 10 | 86.7 | 86.2 | 86.4 | 86.7 | 86.2 | 86.4 | 86.7 | 86.6 | 86.8 |
|  | 15 | 88.4 | 88.5 | 88.3 | 88.4 | 88.5 | 88.3 | 88.7 | 88.7 | 88.4 |
|  | 20 | 90.5 | 90.8 | 90.2 | 90.5 | 90.8 | 90.2 | 90.7 | 90.7 | 90.9 |
|  | 25 | 91.3 | 91.4 | 91.5 | 91.3 | 91.4 | 91.5 | 91.4 | 91.7 | 91.9 |
|  | 30 | 92.5 | 92.9 | 92.7 | 92.5 | 92.9 | 92.7 | 92.5 | 92.4 | 92.2 |
|  | 35 | 93.7 | 93.6 | 93.4 | 93.7 | 93.6 | 93.4 | 93.3 | 93.2 | 93.5 |
|  | 40 | 94.4 | 94.7 | 94.2 | 94.4 | 94.7 | 94.2 | 94.1 | 94.1 | 94.3 |
|  | 45 | 95.2 | 95.7 | 95.9 | 95.2 | 95.7 | 95.9 | 95.3 | 95.3 | 95.7 |
|  | 50 | 96.5 | 96.4 | 96.3 | 96.5 | 96.4 | 96.3 | 96.1 | 96.0 | 96.2 |
|  | 55 | 97.7 | 97.6 | 97.4 | 97.5 | 97.4 | 97.8 | 98.1 | 98.2 | 98.4 |
|  | 60 | 99.3 | 99.4 | 99.2 | 99.2 | 99.3 | 99.1 | 99.4 | 99.5 | 99.6 |
| developed middle layer | 0 | 82.0 | 82.0 | 80.0 | 82.0 | 82.0 | 82.0 | 82.0 | 82.0 | 82.0 |
|  | 5 | 84.5 | 84.1 | 84 | 84.5 | 84.1 | 84 | 84.9 | 84.4 | 84.9 |
|  | 10 | 86.3 | 86.4 | 86.5 | 86.3 | 86.4 | 86.5 | 86.2 | 86.7 | 86.6 |
|  | 15 | 88.4 | 88.2 | 88.7 | 88.4 | 88.2 | 88.7 | 88.5 | 88.8 | 88.6 |
|  | 20 | 90.3 | 90.1 | 90.4 | 90.3 | 90.1 | 90.4 | 90.1 | 90.4 | 90.2 |
|  | 25 | 91.3 | 91.4 | 91.1 | 91.3 | 91.4 | 91.1 | 91.2 | 91.9 | 91.7 |
|  | 30 | 92.7 | 92.2 | 92.3 | 92.7 | 92.2 | 92.3 | 92.1 | 92.2 | 92.4 |
|  | 35 | 93.1 | 93.5 | 93.7 | 93.1 | 93.5 | 93.7 | 93.1 | 93.1 | 93.5 |
|  | 40 | 94.1 | 94.5 | 94.4 | 94.1 | 94.5 | 94.4 | 94.5 | 94.5 | 94.2 |
|  | 45 | 95.5 | 95.2 | 95.3 | 95.5 | 95.2 | 95.3 | 95.3 | 95.2 | 95 |
|  | 50 | 96.5 | 96.5 | 96.7 | 96.5 | 96.5 | 96.7 | 96.5 | 96.5 | 96.7 |
|  | 55 | 98.1 | 98.2 | 98.3 | 98.4 | 98.0 | 97.7 | 97.8 | 98.1 | 98.3 |
|  | 60 | 99.3 | 99.1 | 99.2 | 99.2 | 99.3 | 99.4 | 99.4 | 99.4 | 99.1 |
| developed lower layer | 0 | 82.0 | 82.0 | 80.0 | 82.0 | 82.0 | 82.0 | 82.0 | 82.0 | 82.0 |
|  | 5 | 84.1 | 84.9 | 84.4 | 84.2 | 84.9 | 84.4 | 84.4 | 83.2 | 84.8 |
|  | 10 | 86.8 | 86.2 | 86.2 | 86.8 | 86.2 | 86.2 | 86.7 | 85.4 | 86.8 |
|  | 15 | 88.8 | 88.4 | 88 | 88.8 | 88.4 | 88 | 88.1 | 87.8 | 88.4 |
|  | 20 | 90.1 | 90.7 | 90.3 | 90.1 | 90.7 | 90.3 | 90.4 | 89.3 | 90.9 |
|  | 25 | 91.4 | 91.7 | 91.3 | 91.4 | 91.7 | 913 | 91.1 | 91.4 | 91.6 |
|  | 30 | 92.6 | 92.4 | 92.7 | 92.6 | 92.4 | 92.7 | 92.3 | 92.3 | 92.7 |
|  | 35 | 93.7 | 93.5 | 93.1 | 93.7 | 93.5 | 93.1 | 93.7 | 93.7 | 93.4 |
|  | 40 | 94.7 | 94.4 | 94.2 | 94.7 | 94.4 | 94.2 | 94.5 | 94.4 | 94.2 |
|  | 45 | 95.9 | 95.2 | 95.4 | 95.9 | 95.2 | 95.4 | 95.7 | 95.7 | 95.9 |
|  | 50 | 96.2 | 96.3 | 96.5 | 96.2 | 96.3 | 96.5 | 96.3 | 96.2 | 96.5 |
|  | 55 | 98.7 | 98.8 | 98.1 | 98.2 | 98.6 | 97.8 | 97.7 | 97.7 | 97.8 |
|  | 60 | 99.4 | 99.2 | 99.1 | 99.2 | 99.5 | 99.4 | 99.3 | 99.3 | 99.4 |

TABLE 2

|  | (min) | LF | LM | LR | CF | CM | CR | RF | RM | RR |
|---|---|---|---|---|---|---|---|---|---|---|
| heating upper layer | 0 | 82.0 | 82.0 | 80.0 | 82.0 | 82.0 | 82.0 | 82.0 | 82.0 | 82.0 |
|  | 5 | 84.2 | 91.0 | 93.2 | 81.8 | 87.8 | 91.3 | 84.3 | 85.4 | 93.7 |
|  | 10 | 86.8 | 91.8 | 95.1 | 83.1 | 90.4 | 92.1 | 85.4 | 86.0 | 94.5 |
|  | 15 | 88.4 | 92.5 | 96.0 | 89.2 | 90.2 | 93.8 | 86.7 | 88.7 | 94.3 |
|  | 20 | 89.2 | 92.3 | 97.9 | 87.3 | 91.0 | 93.6 | 86.9 | 88.5 | 93.2 |
|  | 25 | 90.8 | 93.1 | 98.8 | 87.9 | 91.8 | 93.5 | 87.8 | 88.3 | 94.0 |
|  | 30 | 91.4 | 95.8 | 99.6 | 88.1 | 92.5 | 94.2 | 88.3 | 88.9 | 96.7 |
|  | 35 | 92.1 | 96.5 | 99.4 | 89.5 | 94.2 | 96.9 | 88.9 | 90.6 | 97.4 |
|  | 40 | 93.0 | 97.4 | 99.4 | 91.7 | 94.1 | 97.9 | 91.0 | 90.5 | 98.4 |
|  | 45 | 94.9 | 98.4 | 99.4 | 92.4 | 95.1 | 98.8 | 91.2 | 90.4 | 99.4 |
|  | 50 | 96.7 | 99.4 | 99.4 | 92.8 | 97.0 | 99.8 | 91.2 | 92.2 | 99.4 |
|  | 55 | 98.6 | 99.2 | 99.3 | 93.4 | 97.0 | 99.7 | 91.8 | 93.1 | 99.3 |
|  | 60 | 99.4 | 99.1 | 99.1 | 94.2 | 98.8 | 99.5 | 92.7 | 94.0 | 99.1 |

TABLE 2-continued

|  | (min) | LF | LM | LR | CF | CM | CR | RF | RM | RR |
|---|---|---|---|---|---|---|---|---|---|---|
| heating middle layer | 0 | 82.0 | 82.0 | 80.0 | 82.0 | 82.0 | 82.0 | 82.0 | 82.0 | 82.0 |
|  | 5 | 84.2 | 91.0 | 93.2 | 82.0 | 87.8 | 87.3 | 83.3 | 85.4 | 93.7 |
|  | 10 | 86.8 | 91.8 | 95.1 | 84.0 | 90.4 | 89.1 | 86.0 | 86.0 | 94.5 |
|  | 15 | 88.4 | 92.5 | 96.0 | 85.0 | 90.2 | 90.8 | 87.7 | 88.7 | 94.3 |
|  | 20 | 89.2 | 92.3 | 97.9 | 86.0 | 91.0 | 91.6 | 90.5 | 88.5 | 93.2 |
|  | 25 | 90.8 | 93.1 | 98.8 | 86.0 | 91.8 | 91.5 | 90.2 | 88.3 | 94.0 |
|  | 30 | 91.4 | 95.8 | 99.6 | 87.0 | 92.5 | 91.2 | 91.9 | 88.9 | 96.7 |
|  | 35 | 92.1 | 96.5 | 99.4 | 88.0 | 94.2 | 92.9 | 91.6 | 90.6 | 97.4 |
|  | 40 | 93.0 | 97.4 | 99.4 | 89.0 | 94.1 | 94.9 | 92.5 | 90.5 | 98.4 |
|  | 45 | 94.9 | 98.4 | 99.4 | 90.0 | 95.1 | 94.8 | 94.4 | 90.4 | 99.4 |
|  | 50 | 96.7 | 99.4 | 99.4 | 91.0 | 97.0 | 96.8 | 94.3 | 92.2 | 99.4 |
|  | 55 | 98.6 | 99.2 | 99.3 | 92.0 | 97.0 | 98.7 | 95.2 | 93.1 | 99.3 |
|  | 60 | 99.4 | 99.1 | 99.1 | 93.0 | 98.8 | 99.5 | 97.1 | 94.0 | 99.1 |
| heating lower layer | 0 | 82.0 | 82.0 | 80.0 | 82.0 | 82.0 | 82.0 | 82.0 | 82.0 | 82.0 |
|  | 5 | 82.9 | 90.6 | 92.7 | 82.2 | 86.7 | 86.1 | 81.9 | 83.7 | 92.0 |
|  | 10 | 85.5 | 91.4 | 94.6 | 83.9 | 89.4 | 87.9 | 84.6 | 84.3 | 92.8 |
|  | 15 | 87.1 | 92.1 | 95.5 | 84.7 | 90.1 | 89.6 | 86.3 | 85.0 | 93.5 |
|  | 20 | 87.9 | 91.9 | 97.4 | 85.4 | 92.8 | 90.4 | 89.1 | 86.8 | 93.4 |
|  | 25 | 89.5 | 92.7 | 98.3 | 86.2 | 92.6 | 90.3 | 89.8 | 86.6 | 94.2 |
|  | 30 | 90.1 | 93.8 | 99.1 | 87.8 | 93.3 | 90.4 | 90.5 | 87.2 | 95.8 |
|  | 35 | 90.8 | 95.1 | 98.9 | 88.6 | 94.0 | 91.7 | 90.2 | 88.9 | 96.6 |
|  | 40 | 91.7 | 95.5 | 98.9 | 89.5 | 94.4 | 93.7 | 91.1 | 88.8 | 97.5 |
|  | 45 | 93.6 | 96.2 | 98.9 | 90.5 | 95.9 | 93.6 | 92.4 | 89.7 | 98.5 |
|  | 50 | 95.4 | 97.3 | 98.9 | 91.3 | 97.7 | 95.6 | 93.0 | 90.5 | 99.5 |
|  | 55 | 97.3 | 98.8 | 98.8 | 92.2 | 98.6 | 97.5 | 93.8 | 91.4 | 99.3 |
|  | 60 | 98.1 | 98.7 | 98.6 | 94.2 | 98.5 | 98.3 | 95.7 | 92.3 | 99.1 |

TABLE 3

|  | (min) | LF | LM | LR | CF | CM | CR | RF | RM | RR |
|---|---|---|---|---|---|---|---|---|---|---|
| centrifugal upper layer | 0 | 82.0 | 82.0 | 82.0 | 78.0 | 82.0 | 82.0 | 76.0 | 82.0 | 82.0 |
|  | 5 | 84.0 | 83.0 | 82.2 | 78.0 | 84.5 | 83.8 | 76.5 | 81.8 | 82.8 |
|  | 10 | 86.5 | 87.5 | 85.8 | 79.8 | 86.2 | 86.5 | 77.2 | 84.5 | 84.5 |
|  | 15 | 88.0 | 91.1 | 88.4 | 80.5 | 89.9 | 87.2 | 78.9 | 86.2 | 87.2 |
|  | 20 | 91.8 | 92.8 | 89.2 | 81.4 | 90.7 | 89.0 | 80.6 | 88.9 | 89.0 |
|  | 25 | 92.4 | 94.5 | 91.0 | 82.2 | 93.4 | 90.8 | 81.4 | 89.7 | 90.8 |
|  | 30 | 93.2 | 95.3 | 92.8 | 83.1 | 93.2 | 92.6 | 83.1 | 91.5 | 91.6 |
|  | 35 | 94.1 | 96.2 | 93.7 | 85.8 | 94.2 | 93.5 | 84.0 | 91.5 | 92.5 |
|  | 40 | 95.0 | 97.1 | 93.6 | 87.5 | 95.0 | 93.4 | 86.3 | 92.3 | 92.4 |
|  | 45 | 96.8 | 98.0 | 95.4 | 89.2 | 96.9 | 94.3 | 88.4 | 93.2 | 93.3 |
|  | 50 | 97.7 | 98.9 | 95.3 | 90.2 | 96.9 | 95.2 | 89.7 | 93.1 | 94.2 |
|  | 55 | 98.6 | 99.8 | 97.2 | 91.4 | 96.8 | 96.1 | 90.8 | 93.0 | 94.1 |
|  | 60 | 99.5 | 99.6 | 97.1 | 92.5 | 97.6 | 96.0 | 91.2 | 94.9 | 95.0 |
| centrifugal middle layer | 0 | 82.0 | 82.0 | 82.0 | 78.0 | 82.0 | 82.0 | 76.0 | 82.0 | 82.0 |
|  | 5 | 84.2 | 83.8 | 81.8 | 78.9 | 85.0 | 82.4 | 77.3 | 82.0 | 83.3 |
|  | 10 | 88.7 | 86.3 | 85.4 | 81.4 | 87.5 | 83.8 | 78.9 | 85.0 | 84.8 |
|  | 15 | 92.3 | 87.8 | 88.0 | 82.9 | 89.0 | 86.4 | 81.4 | 86.4 | 86.5 |
|  | 20 | 94.0 | 91.6 | 88.8 | 86.7 | 92.8 | 87.2 | 83.3 | 89.4 | 89.2 |
|  | 25 | 95.7 | 92.2 | 90.6 | 87.3 | 93.4 | 89.0 | 83.1 | 89.9 | 90.0 |
|  | 30 | 96.5 | 93.0 | 92.4 | 88.1 | 94.2 | 90.8 | 85.8 | 92.0 | 91.8 |
|  | 35 | 97.4 | 93.9 | 93.3 | 89.0 | 95.1 | 91.7 | 86.8 | 91.7 | 91.8 |
|  | 40 | 98.3 | 94.8 | 93.2 | 89.9 | 96.0 | 91.6 | 85.7 | 92.8 | 92.6 |
|  | 45 | 98.4 | 96.6 | 95.0 | 91.7 | 97.8 | 93.4 | 87.4 | 93.4 | 93.5 |
|  | 50 | 98.5 | 97.5 | 94.9 | 92.6 | 98.7 | 93.3 | 88.4 | 93.6 | 93.4 |
|  | 55 | 99.1 | 98.4 | 96.8 | 93.5 | 99.6 | 93.2 | 88.3 | 93.2 | 93.3 |
|  | 60 | 99.2 | 99.3 | 96.7 | 93.5 | 99.6 | 94.1 | 90.1 | 95.4 | 95.2 |
| centrifugal lower layer | 0 | 82.0 | 82.0 | 82.0 | 72.0 | 82.0 | 82.0 | 76.0 | 82.0 | 82.0 |
|  | 5 | 85.2 | 82.3 | 82.6 | 72.6 | 83.8 | 82.4 | 76.9 | 82.6 | 84.0 |
|  | 10 | 88.4 | 84.8 | 85.8 | 80.8 | 86.4 | 84.8 | 80.1 | 84.8 | 85.5 |
|  | 15 | 90.6 | 86.5 | 88.0 | 83.0 | 89.0 | 85.8 | 82.3 | 87.0 | 85.0 |
|  | 20 | 92.2 | 90.2 | 89.6 | 86.6 | 91.8 | 89.6 | 83.9 | 89.5 | 86.8 |
|  | 25 | 93.8 | 92.0 | 91.2 | 88.2 | 93.6 | 88.9 | 85.5 | 89.9 | 87.4 |
|  | 30 | 95.4 | 94.8 | 92.8 | 88.8 | 94.4 | 93.8 | 87.1 | 91.5 | 88.2 |
|  | 35 | 96.2 | 94.8 | 93.6 | 89.6 | 95.3 | 93.4 | 87.9 | 92.4 | 89.1 |
|  | 40 | 96.0 | 94.6 | 93.4 | 89.4 | 95.2 | 93.4 | 87.7 | 93.1 | 90.0 |
|  | 45 | 97.6 | 96.5 | 95.0 | 90.0 | 96.0 | 95.8 | 89.3 | 93.8 | 91.8 |
|  | 50 | 98.4 | 97.4 | 95.8 | 91.1 | 97.9 | 95.9 | 90.1 | 93.6 | 92.7 |
|  | 55 | 98.6 | 97.3 | 97.6 | 91.8 | 99.8 | 96.1 | 91.9 | 93.4 | 92.6 |
|  | 60 | 99.5 | 98.2 | 97.4 | 92.4 | 99.7 | 96.2 | 91.7 | 95.2 | 94.6 |

TABLE 4

|  | (min) | LF | LM | LR | CF | CM | CR | RF | RM | RR |
|---|---|---|---|---|---|---|---|---|---|---|
| ultrasonic upper layer | 0 | 82.0 | 82.0 | 80.0 | 82.0 | 82.0 | 82.0 | 82.0 | 82.0 | 82.0 |
|  | 5 | 84.4 | 86.8 | 81.0 | 85.1 | 84.4 | 83.6 | 84.3 | 83.4 | 82.6 |
|  | 10 | 86.2 | 89.5 | 84.8 | 86.9 | 86.2 | 86.4 | 85.1 | 84.2 | 84.4 |
|  | 15 | 88.0 | 91.3 | 85.6 | 87.7 | 88.0 | 87.2 | 87.0 | 86.1 | 87.2 |
|  | 20 | 90.9 | 92.2 | 88.4 | 88.5 | 90.9 | 89.1 | 90.9 | 88.0 | 88.1 |
|  | 25 | 91.9 | 93.1 | 88.4 | 88.5 | 90.9 | 89.1 | 90.9 | 88.0 | 89.0 |
|  | 30 | 92.8 | 93.1 | 88.4 | 89.4 | 91.8 | 89.0 | 91.8 | 89.9 | 90.0 |
|  | 35 | 93.8 | 95.0 | 90.2 | 90.3 | 93.7 | 91.9 | 92.8 | 90.8 | 91.9 |
|  | 40 | 94.7 | 96.9 | 91.2 | 90.3 | 93.6 | 92.9 | 92.8 | 91.8 | 92.8 |
|  | 45 | 95.7 | 98.8 | 91.1 | 91.2 | 94.6 | 94.8 | 92.7 | 92.7 | 93.8 |
|  | 50 | 96.6 | 98.8 | 92.1 | 92.2 | 95.5 | 94.8 | 93.7 | 93.7 | 94.8 |
|  | 55 | 97.7 | 99.8 | 93.1 | 92.2 | 96.5 | 95.8 | 93.7 | 93.7 | 94.8 |
|  | 60 | 98.6 | 99.8 | 94.0 | 93.2 | 96.4 | 96.8 | 93.7 | 94.7 | 95.7 |
| ultrasonic middle layer | 0 | 82.0 | 82.0 | 80.0 | 82.0 | 82.0 | 82.0 | 82.0 | 82.0 | 82.0 |
|  | 5 | 89.9 | 84.1 | 88.2 | 88.0 | 86.0 | 91.1 | 85.7 | 84.7 | 89.6 |
|  | 10 | 92.6 | 87.9 | 90.0 | 90.0 | 88.7 | 91.3 | 86.6 | 86.6 | 90.5 |
|  | 15 | 94.4 | 88.7 | 90.8 | 92.0 | 89.6 | 91.8 | 88.6 | 89.6 | 92.5 |
|  | 20 | 95.1 | 91.5 | 91.6 | 92.3 | 91.4 | 92.4 | 90.3 | 90.2 | 94.2 |
|  | 25 | 95.2 | 91.5 | 91.6 | 94.0 | 91.5 | 92.4 | 90.4 | 91.2 | 94.3 |
|  | 30 | 95.9 | 91.5 | 92.5 | 94.5 | 91.3 | 92.4 | 92.4 | 92.4 | 96.3 |
|  | 35 | 96.9 | 93.3 | 93.4 | 95.4 | 94.3 | 94.3 | 93.1 | 94.0 | 96.4 |
|  | 40 | 97.8 | 94.3 | 93.4 | 95.7 | 95.2 | 95.4 | 94.2 | 95.0 | 96.6 |
|  | 45 | 98.8 | 94.2 | 94.3 | 96.3 | 97.2 | 96.2 | 95.2 | 96.2 | 97.1 |
|  | 50 | 99.7 | 95.2 | 95.3 | 97.0 | 97.1 | 97.2 | 96.0 | 96.9 | 97.2 |
|  | 55 | 99.8 | 96.2 | 95.3 | 98.0 | 98.2 | 98.2 | 96.1 | 97.0 | 98.1 |
|  | 60 | 99.7 | 97.1 | 96.3 | 99.0 | 99.1 | 98.2 | 97.2 | 98.1 | 99.2 |
| ultrasonic lower layer | 0 | 90.0 | 85.0 | 89.0 | 88.0 | 88.0 | 88.0 | 88.0 | 87.0 | 91.0 |
|  | 5 | 91.8 | 86.0 | 90.1 | 89.4 | 88.6 | 89.3 | 88.4 | 87.6 | 92.5 |
|  | 10 | 92.7 | 89.8 | 91.9 | 91.2 | 91.4 | 90.1 | 89.2 | 89.4 | 94.4 |
|  | 15 | 93.6 | 90.6 | 92.7 | 93.0 | 92.2 | 92.0 | 89.8 | 92.2 | 93.4 |
|  | 20 | 93.6 | 91.6 | 93.5 | 94.2 | 94.1 | 92.5 | 91.6 | 93.1 | 93.8 |
|  | 25 | 93.5 | 93.4 | 93.5 | 94.3 | 94.1 | 93.4 | 91.7 | 94.0 | 94.1 |
|  | 30 | 94.5 | 93.4 | 94.4 | 96.3 | 94.0 | 93.4 | 91.5 | 95.0 | 94.3 |
|  | 35 | 95.1 | 93.4 | 94.4 | 96.4 | 94.3 | 94.3 | 94.5 | 95.9 | 95.3 |
|  | 40 | 95.2 | 94.4 | 95.4 | 96.6 | 94.2 | 95.3 | 95.4 | 96.9 | 96.3 |
|  | 45 | 96.3 | 94.4 | 95.3 | 96.2 | 95.2 | 95.3 | 97.4 | 97.8 | 96.3 |
|  | 50 | 97.2 | 95.4 | 96.3 | 96.9 | 96.2 | 96.3 | 97.3 | 98.8 | 98.3 |
|  | 55 | 98.1 | 96.2 | 96.3 | 97.0 | 97.1 | 96.8 | 98.4 | 98.9 | 98.3 |
|  | 60 | 98.1 | 97.2 | 97.3 | 98.1 | 98.4 | 97.3 | 99.3 | 99.1 | 99.2 |

From the relative humidity measurement results of the Example and Comparative Examples, it may be understood that the forced evaporative humidifier using nano-vapor according to the Example allows the inside of the storehouse to be uniformly humidified in comparison to the forced evaporative humidifier using nano-vapor according to Comparative Examples 1 to 3. Here, even though the centrifugal humidifier corresponding to Comparative Example 2 is disposed at the same location as the Example, the ultrasonic humidifier corresponding to Comparative Example 3 is located at an optimal location where humidification occurs in a best way. In other words, the forced evaporative humidifier using nano-vapor according to Comparative Example 2 and Comparative Example 3, which supplies water in a particle state, is respectively disposed at the installation location of the Example and at an optimal humidification location and then is compared with the Example. Through the experiment results, when water is sprayed into a particle state to humidify the air, even though the humidifier is provided at an optimal humidification location, the degree of humidification is different depending on a location in the storehouse, and water particles are frozen to the cooling machine to deteriorate the cooling performance of the storehouse.

However, since the forced evaporative humidifier using nano-vapor according to the present disclosure supplies the air for humidification into a storehouse in a humid air state, it is possible to humidify the inside of the storehouse to a uniform humidity state, and thus agricultural products in the storehouse may be freshly stored for a long time.

2) Experimental Example 2

A storehouse was fabricated with keystone panels, namely uneven polyurethane panels, to have a configuration of 1960 mm in length, 1960 mm in width and 2300 mm in height, and sterilization was measured in the storehouse. The temperature in the storehouse was 25° C., and the humidity was 95% to 97%. For the experiment, hydrogen peroxide serving as a sterilizer was sprayed in a gas state for 4 hours, 8 hours and 24 hours, respectively, by using the forced evaporative humidifier using nano-vapor, and then the sterilization at each point in the storehouse was measured. Biological indicators (BR) was installed in the storehouse at three points, namely an upper layer, a middle layer and a lower layer with the heights of 1880 mm, 1040 mm and 120 mm from the bottom, respectively, and the sterilization was measured at three points. Three points were uniformly set in the area from the installation location of the forced evaporative humidifier using nano-vapor to an opposite wall, and relative humidity was measured thereat. Three points where the relative humidity was measured were provided at both walls based on the forced evaporative humidifier using nano-vapor, so that a first point and a second point are respectively located at both ends of one wall in a width direction to be spaced apart from one of both walls by 200 mm and also maintains a spaced state from the front wall and the rear wall by 200 mm. In addition, the third point is located at the center of the other wall spaced apart from the other wall opposite to one wall by 200 mm.

The biological indicator for measuring sterilization employed *Geobacillus stearothermophilus* ATCC#12980, and the sterilization effect was determined by putting the biological indicator collected at every hour into a medium (TSB, Tryptic Soy Broth) and cultivating the same at 55° C. to 60° C. for 7 days, and then checking the discoloration of the culture medium. Here, the biological indicator has a population average of $2.0 \times 10^6$ CFU/stainless steel carrier (heat shock population determined at 95-100° C. for 15 minutes).

Example 1

A forced evaporative humidifier using nano-vapor having a film-type humidifying unit as shown in FIG. 2 was used, and a STF12 nozzle produced by KUKJE NOZZLE was selected as the nozzle. At this time, the nozzle had an allowable injection angle of 120° and an injection pressure of 0.7 kg/cm$^2$. The installation location in the storehouse was a center spaced apart from the front wall by 200 mm. The injected sterilizer was 15% hydrogen peroxide.

Example 2

The sterilizer was injected in the same way as Example 1, and the sterilizer was 30% hydrogen peroxide.

Sterilization State Measurement Results

After cultivation was performed at each point by using the biological indicator of Example 1 and Example 2, sterilization was performed perfectly (100%) at every treatment point by means of humidified spraying of the sterilizer for 4 hours or more.

From the sterilization effect measurement results of the Example 1 and Example 2, it may be understood that when a sterilizer is injected using the forced evaporative humidifier using nano-vapor according to Example 1 and Example 2, the inside of the storehouse may be uniformly sterilized and thus the entire storehouse may be effectively kept in a sterilized state. In addition, since the sterilizer is supplied in a gas state, different from an existing method where a sterilizer is sprayed in a liquid state, sterilizer stains do not remain on the instruments provided in the sterilized room, and no dew condensation occurs. Therefore, the storehouse may be maintained in a clean state externally, and the inside of the storehouse may be uniformly sterilized.

Simple changes or modifications of the present disclosure can be easily implemented by those having ordinary skill in the art, and such changes and modifications should be regarded as falling within the scope of the present disclosure.

The invention claimed is:

1. A forced evaporative humidifier using nano-vapor, comprising:
   a housing having an exhaust port formed in an upper surface thereof and a suction port formed at one side of a front surface thereof;
   a water tank located below the suction port to store water;
   an injection unit having an injection nozzle located above the suction port, a pump for pulling up the water in the water tank to the injection nozzle, and a transfer tube for transferring the water pulled by the pump;
   a blowing fan located above the injection nozzle to carry air toward the exhaust port of the housing;
   a humidifying unit located below the injection nozzle so that films, each having a body surface formed to allow the water injected from the injection nozzle to flow and a plurality of tube-type spacers protruding on the body surface, are stacked in a lateral direction therein; and
   an eliminator located between the blowing fan and the injection nozzle to prevent water drops included in a humid air humidified by the humidifying unit from being scattered,
   wherein a plurality of slits formed in a horizontal direction between one pair of spacers adjacent to each other in the horizontal direction are formed in the film, and
   wherein the plurality of slits include a first slit protruding so that a cut position of the body surface cut by the slit is oriented toward an upper direction of the body surface and a second slit protruding so that a cut position of the body surface cut by the slit is oriented toward a lower direction of the body surface.

2. The forced evaporative humidifier using nano-vapor according to claim 1, further comprising:
   a heat exchanger installed at the suction port to allow communication of a fluid,
   wherein a barrier for separating the humidifying unit and the heat exchanger from each other is formed at the housing so that water passing through the humidifying unit does not flow into the heat exchanger.

3. The forced evaporative humidifier using nano-vapor according to claim 1, wherein the spacers are arranged alternately in a vertical direction on the same film.

4. The forced evaporative humidifier using nano-vapor according to claim 1, wherein the films are stacked so that the spacers communicate with each other.

5. The forced evaporative humidifier using nano-vapor according to claim 4, wherein the humidifying unit further includes a coupling tube inserted into the spacers of the films stacked in a lateral direction.

6. The forced evaporative humidifier using nano-vapor according to claim 1, wherein a water feeding unit for supplying water is provided at the water tank, and
   wherein the forced evaporative humidifier using nano-vapor further comprises a floating valve for controlling the water feeding unit to open or close according to a location of a float which floats on the water.

7. The forced evaporative humidifier using nano-vapor according to claim 1, wherein a constant temperature coil is provided at the water tank to maintain the water in the water tank at a constant temperature.

8. The forced evaporative humidifier using nano-vapor according to claim 1, wherein the surface of the film of the humidifying unit is treated to have an antibacterial property.

9. The forced evaporative humidifier using nano-vapor according to claim 1, wherein the eliminator has an inlet through which the air humidified by the humidifying unit flows in, an outlet located at a side opposite to the inlet, and an anti-scattering tube provided between the inlet and the outlet so that the inlet and the outlet are alternately located in a vertical direction, and
   wherein the inlet and the outlet of the eliminator have a hexagonal shape.

10. The forced evaporative humidifier using nano-vapor according to claim 1, wherein a dust-removing filter is mounted to the suction port.

11. The forced evaporative humidifier using nano-vapor according to claim 2, wherein a defrosting machine is installed at the heat exchanger.

12. The forced evaporative humidifier using nano-vapor according to claim 11, wherein a temperature-adjusting coil is formed at the heat exchanger, and
   wherein the defrosting machine is located between the temperature-adjusting coils at regular arrangement.

13. A forced evaporative humidifier using nano-vapor, comprising:
- a housing having an exhaust port formed in an upper surface thereof and a suction port formed at one side of a front surface thereof;
- a water tank located below the suction port to store water;
- an injection unit having an injection nozzle located above the suction port, a pump for pulling up the water in the water tank to the injection nozzle, and a transfer tube for transferring the water pulled by the pump;
- a blowing fan located above the injection nozzle to carry air toward the exhaust port of the housing;
- a humidifying unit located below the injection nozzle so that films, each having a body surface formed to allow the water injected from the injection nozzle to flow and a plurality of tube-type spacers protruding on the body surface, are stacked in a lateral direction therein; and
- an eliminator located between the blowing fan and the injection nozzle to prevent water drops included in a humid air humidified by the humidifying unit from being scattered,
- wherein a sterilizer for controlling bacterial multiplication and removing bacteria is further provided at the water tank.

14. The forced evaporative humidifier using nano-vapor according to claim 13, wherein the sterilizer irradiates UV rays into the water tank.

15. The forced evaporative humidifier using nano-vapor according to claim 13, wherein the sterilizer applies electricity into the water tank so that the water in the water tank is converted into electrolyzed water.

16. The forced evaporative humidifier using nano-vapor according to claim 13, wherein the sterilizer is an ozone water generator dissolving ozone gas in water to convert the water into ozone water.

17. A forced evaporative humidifier using nano-vapor, comprising:
- a housing having an exhaust port formed in an upper surface thereof and a suction port formed at one side of a front surface thereof;
- a water tank located below the suction port to store water;
- an injection unit having an injection nozzle located above the suction port, a pump for pulling up the water in the water tank to the injection nozzle, and a transfer tube for transferring the water pulled by the pump;
- a blowing fan located above the injection nozzle to carry air toward the exhaust port of the housing;
- a humidifying unit located below the injection nozzle so that films, each having a body surface formed to allow the water injected from the injection nozzle to flow and a plurality of tube-type spacers protruding on the body surface, are stacked in a lateral direction therein; and
- an eliminator located between the blowing fan and the injection nozzle to prevent water drops included in a humid air humidified by the humidifying unit from being scattered,
- wherein the water tank is partitioned by a separation plate, and
- wherein the water tank partitioned by the separation plate has a water storage unit for storing water and a supplied liquid storage unit to which a sterilizer or the water in the water storage unit is supplied, the supplied liquid storage unit communicating with the transfer tube.

18. The forced evaporative humidifier using nano-vapor according to claim 17, wherein the separation plate has a T shape and partitions the water tank into three regions,
- wherein the water tank partitioned into three regions by the separation plate further includes a sterilizing solution storage unit for storing a sterilizer, and
- wherein the separation plate has a water supply port communicatively formed between the water storage unit and the supplied water storage unit to be openable and closeable and a sterilizing solution supply port communicatively formed between the sterilizing solution storage unit and the supplied water storage unit to be openable and closeable.

19. The forced evaporative humidifier using nano-vapor according to claim 17, wherein the sterilizer is at least one selected from the group consisting of oxygenated water, chlorine dioxide water, hypochlorous acid water, ozone water, a tetravalent ammonium chloride solution, and electrolyzed water.

* * * * *